United States Patent
Ichigaya et al.

(10) Patent No.: US 11,647,195 B2
(45) Date of Patent: *May 9, 2023

(54) IMAGE ENCODING DEVICE, IMAGE DECODING DEVICE, AND THE PROGRAMS THEREOF

(71) Applicant: NIPPON HOSO KYOKAI, Tokyo (JP)

(72) Inventors: Atsuro Ichigaya, Tokyo (JP); Shunsuke Iwamura, Tokyo (JP); Yasuko Morita, Tokyo (JP); Shinichi Sakaida, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,832

(22) Filed: Jan. 3, 2022

(65) Prior Publication Data

US 2022/0132127 A1 Apr. 28, 2022

Related U.S. Application Data

(63) Continuation of application No. 15/084,073, filed on Mar. 29, 2016, now Pat. No. 11,223,827, which is a (Continued)

(30) Foreign Application Priority Data

Sep. 30, 2013 (JP) .............................. JP2013-203529

(51) Int. Cl.
*H04N 19/126* (2014.01)
*H04N 19/176* (2014.01)
(Continued)

(52) U.S. Cl.
CPC ......... *H04N 19/126* (2014.11); *H04N 19/107* (2014.11); *H04N 19/117* (2014.11);
(Continued)

(58) Field of Classification Search
CPC ...... H04N 19/00; H04N 19/197; H04N 19/56; H04N 19/103; H04N 19/105;
(Continued)

(56) References Cited

U.S. PATENT DOCUMENTS 5,253,054 A * 10/1993 Fujiwara .............. H04N 19/172
375/E7.145
6,658,157 B1 * 12/2003 Satoh .................... G06F 17/147
375/E7.143

(Continued)

FOREIGN PATENT DOCUMENTS

EP 2136566 A1 12/2009
WO 2013/057782 A1 4/2013

OTHER PUBLICATIONS

Morigami, Y. et al., "On Transform Skip", Joint Collaborative Team on Video Coding (JCT-VC) of ITU-T SG 16 WP 3 and ISO/IEC JTC 1/SC 29/WG 11, 10th Meeting: Stockholm, SE, Jul. 11-20, 2012, [JCTVC-J0184], pp. 1-11.

(Continued)

*Primary Examiner* — Tung T Vo

(57) ABSTRACT

An image coding device is provided with a determination unit which determines whether to apply an orthogonal transform to a transform block obtained by dividing a prediction difference signal indicating a difference between an input image and a predicted image or perform a transform skip by which the orthogonal transform is not applied, and an orthogonal transform unit which performs processing selected on the basis of the determination, the image coding device comprising a quantization unit which, when the transform skip is selected on the basis of the determination, quantizes the transform block using a first quantization matrix in which the quantization roughnesses of all elements previously shared with a decoding side are equal, and when the orthogonal transform is applied to the transform block on (Continued)

the basis of the determination, quantizes the transform block using the first quantization matrix or a second quantization matrix that is transmitted to the decoding side.

4 Claims, 16 Drawing Sheets

Related U.S. Application Data continuation of application No. PCT/JP2014/072791, filed on Aug. 29, 2014.

(51) Int. Cl.
| H04N 19/157 | (2014.01) |
|---|---|
| H04N 19/107 | (2014.01) |
| H04N 19/117 | (2014.01) |
| H04N 19/139 | (2014.01) |
| H04N 19/159 | (2014.01) |
| H04N 19/18 | (2014.01) |
| H04N 19/44 | (2014.01) |
| H04N 19/52 | (2014.01) |
| H04N 19/593 | (2014.01) |
| H04N 19/91 | (2014.01) |
| H04N 19/12 | (2014.01) |
| H04N 19/61 | (2014.01) |
| H04N 19/70 | (2014.01) |

(52) U.S. Cl.
CPC ......... *H04N 19/139* (2014.11); *H04N 19/157* (2014.11); *H04N 19/159* (2014.11); *H04N 19/176* (2014.11); *H04N 19/18* (2014.11); *H04N 19/44* (2014.11); *H04N 19/52* (2014.11); *H04N 19/593* (2014.11); *H04N 19/91* (2014.11); *H04N 19/12* (2014.11); *H04N 19/61* (2014.11); *H04N 19/70* (2014.11)

(58) Field of Classification Search
CPC .. H04N 19/176; H04N 19/126; H04N 19/107; H04N 19/117; H04N 19/139; H04N 19/157; H04N 19/159; H04N 19/18; H04N 19/44; H04N 19/52; H04N 19/593; H04N 19/91; H04N 19/12; H04N 19/61; H04N 19/70
USPC .................................................. 375/240.16
See application file for complete search history.

(56) References Cited

U.S. PATENT DOCUMENTS

| 9,716,894 | B2* | 7/2017 | Joshi | H04N 19/70 |
|---|---|---|---|---|
| 2002/0012395 | A1* | 1/2002 | Song | H04N 19/197 |
| | | | | 375/240.03 |
| 2002/0025001 | A1* | 2/2002 | Ismaeil | H04N 19/56 |
| | | | | 375/240.16 |
| 2006/0291556 | A1* | 12/2006 | Watanabe | H04N 19/176 |
| | | | | 375/240.03 |
| 2007/0206867 | A1* | 9/2007 | Tamura | H04N 19/176 |
| | | | | 375/E7.181 |
| 2010/0086028 | A1* | 4/2010 | Tanizawa | H04N 19/176 |
| | | | | 375/240.12 |
| 2010/0238997 | A1* | 9/2010 | Yang | H04N 19/105 |
| | | | | 375/240.03 |
| 2011/0090960 | A1* | 4/2011 | Leontaris | H04N 19/103 |
| | | | | 375/240.12 |
| 2013/0271566 | A1* | 10/2013 | Chen | H04N 19/597 |
| | | | | 348/43 |
| 2014/0003493 | A1* | 1/2014 | Chen | H04N 19/597 |
| | | | | 375/240.02 |
| 2014/0022343 | A1* | 1/2014 | Chen | H04N 19/70 |
| | | | | 348/43 |
| 2014/0023138 | A1* | 1/2014 | Chen | H04N 19/597 |
| | | | | 375/240.12 |
| 2014/0064381 | A1* | 3/2014 | Terada | H04N 19/463 |
| | | | | 375/240.24 |
| 2014/0079329 | A1* | 3/2014 | Shibahara | H04N 19/463 |
| | | | | 382/233 |
| 2014/0086318 | A1* | 3/2014 | Kerofsky | H04N 11/004 |
| | | | | 375/240.12 |
| 2014/0169452 | A1* | 6/2014 | Lim | H04N 19/176 |
| | | | | 375/240.03 |
| 2015/0063446 | A1* | 3/2015 | Sugio | H04N 19/13 |
| | | | | 375/240.03 |
| 2015/0071356 | A1* | 3/2015 | Kim | H04N 19/513 |
| | | | | 375/240.16 |
| 2015/0139304 | A1* | 5/2015 | Sato | H04N 19/176 |
| | | | | 375/240.03 |
| 2015/0139305 | A1* | 5/2015 | Sato | H04N 19/176 |
| | | | | 375/240.03 |
| 2015/0189289 | A1* | 7/2015 | Kim | H04N 19/167 |
| | | | | 375/240.02 |
| 2015/0189327 | A1* | 7/2015 | Kondo | H04N 19/00 |
| | | | | 382/233 |
| 2015/0245066 | A1* | 8/2015 | Sato | H04N 19/176 |
| | | | | 375/240.18 |
| 2015/0319440 | A1* | 11/2015 | Tokumitsu | H04N 19/13 |
| | | | | 375/240.03 |
| 2017/0099494 | A1* | 4/2017 | Takeuchi | H04N 19/176 |
| 2020/0020134 | A1* | 1/2020 | Tsukuba | H04N 19/117 |
| 2021/0006796 | A1* | 1/2021 | Tsukuba | H04N 19/61 |

OTHER PUBLICATIONS

Recommendation ITU-T H.265, (Apr. 2013), "High-Efficiency Video Coding", International Telecommunication Union, Apr. 2013, 317 pages.

Search Report, and English language translation thereof, in corresponding International Application No. PCT/JP2014/072791, dated Nov. 18, 2014, 2 pages.

Bross, B. et al., "High Efficiency Video Coding (HEVC) Text Specification Draft 6", Joint Collaborative Team on Video Coding (JCT-VC) of ITU-T SG16 WP3 and ISO/IEC JTC1/SC29/WG11 and ITU-T SG. 16, 8th Meeting, San Jose, CA, Feb. 2012, 259 pages.

Flynn, D. et al. "Transform Skipping in the Presence of Scaling Lists", Joint Collaborative Team on Video Coding (JCT-VC) of ITU-T SG 16 WP3 and ISO/IEC JTC1/SC29/WG11, 10th Meeting, Stockholm, Jul. 11-20, 2012, 6 pages.

Junichi, T. et al., "Quantization Matrix for HEVC", Joint Collaborative Team on Video Coding (JCT-VC) of ITU-T SG 16 WP3 and ISO/IEC JTC1/SC29/WG11, 5th Meeting, Geneva, CH, Mar. 2011, 24 pages.

Kim, H.Y., et al., "QM Bypass for Transform Skip Mode", Joint Collaborative Team on Video Coding (JCT-VC) of ITU-T SG 16 WP3 and ISO/IEC JTC1/SC29/WG11, 10th Meeting, Stockholm, Jul. 11-20, 2012, 4 pages.

Lan, C. et al., "Intra Transform Skipping", Joint Collaborative Team on Video Coding (JCT-VC) of ITU-T SG16 WP3 and ISO/IEC 1/SC 29 WG 11, 9th Meeting, Geneva, CH, Apr. 27-May 7, 2012, 11 pages.

Lou, Y et al, "Scaling List Selection for Transform Skip Mode", Joint Collaborative Team on Video Coding (JCT-VC) of ITU-T SG16 WP3 and ISO/IEC 1/SC 29 WG 11, 11th Meeting, Shanghai, CN, Oct. 2012, 6 pages.

Office Action, and English language translation thereof, in corresponding Japanese Application No. 2015-525679, dated Jul. 14, 2015, 7 pages.

Office Action, and English language translation thereof, in corresponding Japanese Application No. 2015-525679, dated Nov. 17, 2015, 6 pages.

Extended Search Report in corresponding European Application No. 14846805.1, dated, May 10, 2017, 12 pages.

(56) References Cited

OTHER PUBLICATIONS

Chinese Patent Office, First Office Action for Chinese Application No. 201480053809.9, dated Feb. 14, 2018, including English Translation, pp. 1-13.
Kim et al., "QM Bypass for Transform Skip Mode" Joint Collaborative Team on Video Coding (JCT-VC) of ITU-T SG 16 WP 3 and ISO/IEC JTC 1/SC 29/WG 11, 10th Meeting, Stockholm, SE, Jul. 11-20, 2012, pp. 1-5.
Office Action in India Application No. 201617011033, dated Feb. 11, 2020, 8 pages.

* cited by examiner

FIG. 3 tb11

| 16 | 16 | 16 | 16 |
|----|----|----|----|
| 16 | 16 | 16 | 16 |
| 16 | 16 | 16 | 16 |
| 16 | 16 | 16 | 16 |

FIG. 4 tb21

| 6  | 13 | 20 | 20 |
|----|----|----|----|
| 13 | 20 | 28 | 28 |
| 28 | 28 | 32 | 37 |
| 32 | 32 | 37 | 42 |

FIG. 5 tb22

| 10 | 14 | 20 | 20 |
|----|----|----|----|
| 14 | 20 | 24 | 24 |
| 24 | 24 | 27 | 30 |
| 27 | 27 | 30 | 34 |

IMAGE ENCODING DEVICE, IMAGE DECODING DEVICE, AND THE PROGRAMS THEREOF

RELATED APPLICATIONS

This application is a Continuation of U.S. patent application Ser. No. 15/084,073 filed Mar. 29, 2016, which is a continuation of PCT/JP2014/072791 filed on Aug. 29, 2014, which claims priority to Japanese Application No. 2013-203529 filed on Sep. 30, 2013. The entire contents of these applications are incorporated herein by reference.

TECHNICAL FIELD

This invention relates to an image encoding device, an image decoding device and programs thereof.

BACKGROUND ART

With the spread of multimedia technology, even in daily life, moving images are often handled. The image data generally have lots of information, and, multiple still images from the moving image. Therefore, when transmitting/storing the moving image data, the amount of information is usually compressed using image encoding technology. An encoding scheme that can compress the amount of information with high efficiency is the predictive encoding scheme. The predictive encoding scheme consists of the process of predicting the predicted image at the current moment from the image encoded in the past, and the process of encoding the difference image which is the difference between the input image that has been input and the predicted image. In encoding of difference images, transforming process, or lossless encoding such as the entropy encoding after quantizing the transformation coefficient represented by the transformation domain (for example, spatial frequency domain) are performed to difference images. The human visual characteristic is more sensitive in the frequency band where the spatial frequency is lower (the lower band) than in the higher band. Therefore, there are cases in which quantization width that is smaller in the quantization as the band becomes lower and larger as the band becomes higher. Such data formed by the quantization width for each in-block coordinate or frequency are called the quantization matrix, in this way the emphasis is placed on the low-frequency components of the difference signal, therefore, even if the amount of information is compressed, the deterioration of subjective quality is controlled.

A typical method of the predictive encoding scheme is HEVC (High-Efficiency Video Coding, high-efficiency image encoding) scheme (also referred to as ISO/IEC 23008-2 HEVC, ITU-T Recommendation H.265) described in Non-Patent Document 1. In HEVC scheme, it is decided as to whether or not orthogonal transformation, a type of transforming process, is to be omitted (skipped) for each block, which is a part of the difference image, and when decided to be omitted, lossless encoding is performed after quantizing the difference image. Here, for each decision as to whether or not to perform an orthogonal transformation, the size of the difference is compared to determine whether or not to skip the orthogonal transformation. The process mode that skips the orthogonal transformation and performs the quantizing and encoding is called the TS (TS: Transform Skip) mode. Even if the low-frequency components of difference image are not the main part, the amount of information can be compressed if TS mode is selected.

PRIOR ART DOCUMENTS

Non-Patent Documents

Non-Patent Document 1: Recommendation ITU-T H.265, (April 2013), "High-efficiency video coding", International Telecommunication Union, April 2013

SUMMARY OF THE INVENTION

However, in the encoding scheme described in Non-Patent Document 1, when both blocks are having undergone the orthogonal transformation and blocks not having undergone the orthogonal transformation at the same time, there is the issue of deterioration of subjective image quality. For example, if the roughness of quantization is set such that the roughness becomes greater as the bandwidth becomes higher in the blocks subjected to the orthogonal transformation, the roughness of quantization is different between pixels in the blocks subjected to the orthogonal transformation. Thus, there are variations between pixels and the subjective image quality deteriorates.

This invention is carried out in light of this, providing an image encoding device, an image decoding device and programs thereof that can reduce the deterioration of subjective image quality resulted from quantization, even if the blocks having undergone the orthogonal transformation and blocks without orthogonal transformation coexist.

(1) The present invention is made to solve the above problem and has a feature that an image encoding device includes: a determination unit that determines either to apply an orthogonal transformation or to perform a transformation skip not to apply the orthogonal transformation to a transformation blocks obtained by dividing a predicted difference signal, which represents a difference between an input image and a predicted image, an orthogonal transformation unit performing the process selected based on the determination, and a quantization unit that quantizes the transformation blocks using a first quantization matrix when the transformation skip is selected based on the determination, the first quantization matrix being a matrix that roughnesses of all elements are equal to roughnesses shared with a decoding side in advance, and the transformation blocks using the first quantization matrix or a second quantization matrix when the orthogonal transformation is applied to the transformation blocks based on the determination, the second quantization matrix being a matrix transmitted to the decoding side.

(2) Another embodiment of the present invention has a feature that an image encoding device includes: a determination unit that determines either to apply an orthogonal transformation or to perform a transformation skip not to apply the orthogonal transformation to a transformation blocks obtained by dividing a predicted difference signal, which represents a difference between an input image and a predicted image, an orthogonal transformation unit performing the process selected based on the determination, and a quantization unit that quantizes the transformation blocks using a first quantization matrix or a representative value of a second quantization matrix when the transformation skip is selected based on the determination, the first quantization matrix being a matrix that roughnesses of all elements are equal to roughnesses shared with a decoding side in advance and the second quantization matrix being a matrix transmitted to the decoding side, and the transformation blocks using the first quantization matrix or the second quantization matrix when the orthogonal transformation is applied to the transformation blocks based on the determination.

(3) Another embodiment of the present invention has a feature that an image encoding device includes: a determination unit that determines either to apply an orthogonal transformation or to perform a transformation skip not to apply the orthogonal transformation to a transformation blocks obtained by dividing a predicted difference signal, which represents a difference between an input image and a predicted image, an orthogonal transformation unit performing the process selected based on the determination, and a quantization unit that quantizes the transformation blocks using a first quantization matrix or a third quantization matrix when the transformation skip is selected based on the determination, the first quantization matrix being a matrix that roughnesses of all elements are equal to roughnesses shared with a decoding side in advance and the third quantization matrix being a matrix that roughnesses of all elements are expressed by a single value transmitted to the decoding side, and the transformation blocks using the first quantization matrix or a second quantization matrix when the orthogonal transformation is applied to the transformation blocks based on the determination, the second quantization matrix being a matrix transmitted to the decoding side.

(4) Another embodiment of the present invention according to any one of the image encoding devices described in (1) to (3) has a feature that the quantization unit performs the quantization using the second transformation matrix if the orthogonal transformation is applied to the transformation blocks based on the determination when the second transformation matrix is transmitted, and using the first transformation matrix if the orthogonal transformation is applied to the transformation blocks based on the determination when the second transformation matrix is not transmitted.

(5) Another embodiment of the present invention according to the image encoding device described in (1) has a feature that the quantization unit performs the quantization using the first quantization matrix if the transformation skip is selected for the transformation blocks based on the determination when the second transformation matrix is transmitted.

(6) Another embodiment of the present invention has a feature that an image decoding device includes: an inverse quantization unit that inversely quantizes quantized blocks contained in encoded data using a first quantization matrix when the quantized blocks are blocks subjected to a transformation skip not applied an orthogonal transformation, the first quantization matrix being a matrix that roughnesses of all elements are equal to roughnesses shared with an encoding side in advance, and the quantized blocks contained in the encoded data using the first quantization matrix or a second quantization matrix when the quantized blocks are blocks subjected to the orthogonal transformation, the second quantization matrix being a matrix transmitted from the encoding side.

(7) Another embodiment of the present invention has a feature that an image decoding device includes: an inverse quantization unit that inversely quantizes quantized blocks contained in encoded data using a first quantization matrix or a representative value of a second quantization matrix when the quantized blocks are blocks subjected to a transformation skip not applied an orthogonal transformation, the first quantization matrix being a matrix that roughnesses of all elements are equal to roughnesses shared with an encoding side in advance and the second quantization matrix being a matrix transmitted from the encoding side, and the quantized blocks contained in the encoded data using the first quantization matrix or a second quantization matrix when the quantized blocks are blocks subjected to the orthogonal transformation.

(8) Another embodiment of the present invention has a feature that an image decoding device includes: an inverse quantization unit that inversely quantizes quantized blocks contained in encoded data using a first quantization matrix or a third quantization matrix when the quantized blocks are blocks subjected to a transformation skip not applied a orthogonal transformation, the first quantization matrix being a matrix that roughnesses of all elements are equal to roughnesses shared with an encoding side in advance and the third quantization matrix being a matrix that roughnesses of all elements are expressed by a single value transmitted from the encoding side, and the quantized blocks contained in the encoded data using the first quantization matrix or a second quantization matrix when the quantized blocks are blocks subjected to the orthogonal transformation, the second quantization matrix being a matrix transmitted from the encoding side.

(9) Another embodiment of the present invention according to any one of the image decoding devices described in (6) to (8) has a feature that the inverse quantization unit performs the inverse quantization using the second transformation matrix if the quantized blocks contained in the encoded data are blocks subjected to the orthogonal transformation when the second transformation matrix is transmitted, and using the first transformation matrix if the quantized blocks contained in the encoded data are blocks subjected to the orthogonal transformation when the second transformation matrix is not transmitted.

(10) Another embodiment of the present invention according to the image decoding device described in (6) has a feature that the inverse quantization unit performs the inverse quantization using the first quantization matrix if the quantized blocks contained in the encoded data are blocks subjected to a transformation skip not applied an orthogonal transformation when the second transformation matrix is transmitted.

(11) Another embodiment of the present invention is a program causing a computer to function as the image encoding devices described in any of (1) to (5).

(12) Another embodiment of the present invention is a program causing a computer to function as the image decoding devices described in any of (6) to (10).

BRIEF DESCRIPTION OF THE DRAWINGS

FIG. 3 is a table to illustrate quantization matrix tb11 in the same embodiment.

FIG. 4 is a table to illustrate quantization matrix tb21 in the same embodiment.

FIG. 5 is a table to illustrate quantization matrix tb22 in the same embodiment.

DETAILED DESCRIPTION OF THE PREFERRED EMBODIMENTS

First Embodiment

Figure 1:
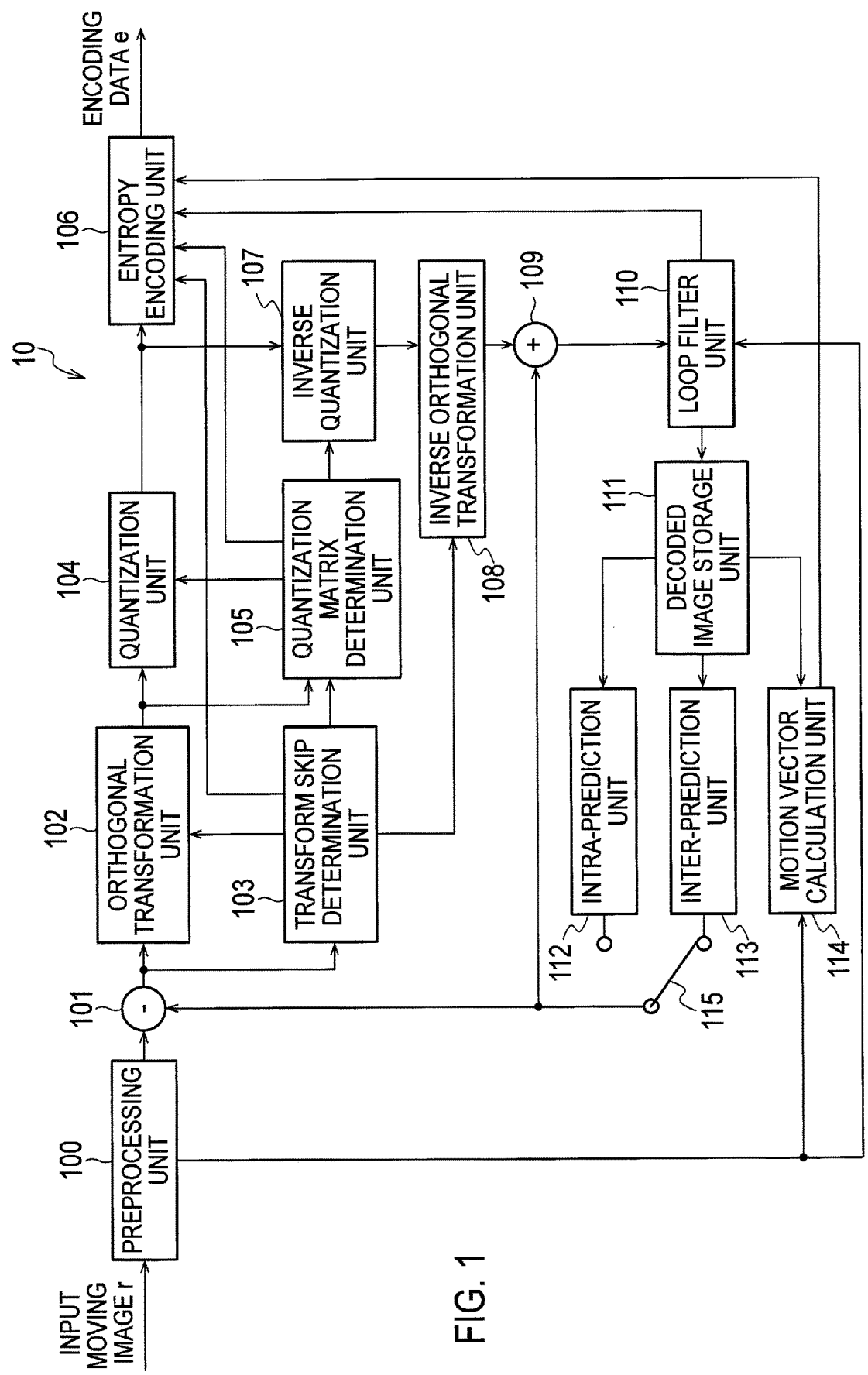
FIG. 1 is a block diagram to illustrate an example of schematic structure of an image encoding device 10 in the first embodiment of this invention.

In the following, concerning the drawings, we will illustrate the first embodiment of this invention. FIG. 1 is a block diagram demonstrating an example of schematic structure of an image encoding device 10 in this embodiment. The image encoding device 10 encodes input moving image r and generates encoding data. In the example shown in FIG. 1, the image encoding device 10 is composed of a preprocessing unit 100, a predicted difference signal generation unit 101, an orthogonal transformation unit 102, a TS determination unit 103, a quantization unit 104, a quantization matrix determination unit 105, an entropy encoding unit 106, an inverse quantization unit 107, an inverse orthogonal transformation unit 108, a decoded image generation unit 109, a loop filter unit 110, a decoded image storage unit 111, an intra-prediction unit 112, an inter-prediction unit 113, a motion vector calculation unit 114, and a predicted image selection unit 115. The outlines of these units are each described below.

The the preprocessing unit 100 performs the sorting of pictures by picture type for the input moving images r that have been input, and sequentially outputs the picture types and frame images along with the frames, etc. Moreover, the preprocessing unit 100 performs the block division for each frame image to the encoding block. Further, the size of encoding block has three types, 8×8, 16×16, and 32×32. For determining which of these shall be the size of encoding block, any method may be used, for example, concerning the spatial frequency distribution in that domain, the smaller the high-frequency component, the larger the size of encoding block, etc.

The predicted difference signal generation unit 101 retrieves the encoding blocks divided by the preprocessing unit 100. The predicted difference signal generation unit 101 generates predicted difference signal with those encoding blocks and the block data of the predicted images input from the predicted image selection unit 115. More specifically, the predicted difference signal is generated by subtracting the corresponding pixel value of block data input from the predicted image selection unit 115 from each pixel value of encoding blocks of the predicted image selection unit 115. The predicted difference signal generation unit 101 inputs the generated predicted difference signal to the orthogonal transformation unit 102 and the TS determination unit 103.

The orthogonal transformation unit 102 divides the input predicted difference signal into transformation blocks. Further, the size of transformation block has four types, 4×4, 8×8, 16×16, and 32×32. For determining which of these shall be the size of each transformation block, any method may be used. For example, the orthogonal transformation unit 102 calculates the value representing the magnitude of the difference between the decoding result after decoding such encoding data and the input moving image, and the evaluation value based on the number of bits of encoding data in the case of each size, and the size when such evaluation value is the largest is used. Further, evaluation value increases as the number of bits of encoding data become less, and also increases as the magnitude of the difference between the decoding result and the input moving image becomes smaller.

The orthogonal transformation unit 102 performs orthogonal transformation process such as discrete cosine transformation to the divided transformation blocks and generates quantization blocks. However, for transformation blocks judged as unqualified for orthogonal transformation by the TS determination unit 103, the transformation blocks becomes quantization blocks without any change. Further, as the block size doesn't change in orthogonal transformation, the size of transformation block and the size of quantization block after its orthogonal transformation are the same.

The TS determination unit 103 determines whether orthogonal transformation shall be performed to each transformation block. The TS determination unit 103, for example, calculates the spatial frequency distribution of transformation blocks and perform TS when the difference between the maximum and minimum values of frequency components is below a predefined threshold. Further, other methods may also be used to determine whether or not to perform an orthogonal transformation. Moreover, in this embodiment, as with HEVC, the orthogonal transformation may be disabled (TS) except when the size of transformation block is 4×4.

The TS determination unit 103 inputs the TS flag (transform_skip_flag) indicating whether or not the transformation block is enabled for that orthogonal transformation to entropy encoding unit 106 and quantization matrix determination unit 105 when orthogonal transformation can be disabled for such transformation block. Further, when orthogonal transformation can be disabled for the transformation block, in the case of this embodiment, it is when the size of transformation block is 4×4. Moreover, when TS flag is "1", it means the orthogonal transformation shall be disabled, and when "0," the orthogonal transformation shall be enabled.

The quantization unit 104 quantizes the quantization blocks that are the output signal from the orthogonal transformation unit 102. The quantization unit 104 reduces the code amount of the output signal by quantizing and inputs this output signal (quantized blocks) into the entropy encoding unit 106 and the inverse quantization unit 107. The quantization unit 104, when quantizing the quantization blocks, uses the quantization matrix determined by the quantization matrix determination unit 105 for each quantization block. This quantization matrix is one representing the roughness of quantization when each of its factors factor (hereinafter, quantization value) quantizes the factors corresponding to the quantization blocks. The larger the quantization value, the larger the quantization step.

The quantization matrix determination unit 105 determines the quantization matrix for each quantization block. The quantization matrix determination unit 105 determines the quantization matrix of those of all quantization blocks that are obtained by TS in such a way that, in the quantization matrix, the roughness of quantization of all factors is equal, that is, all quantization values are of the same value. The method to determine the quantization matrix will be described later.

The quantization matrix determination unit 105 inputs the transmission quantization matrix enabling flag (scaling_list_enable_flag) that indicates whether or not to use the transmission quantization matrix to transmit to the decoding side in the form of quantization matrix into the entropy encoding unit 106. Furthermore, when transmission quantization matrix enabling flag is "1", which indicates that transmission quantization matrix is used, the quantization matrix determination unit 105 inputs the scaling list (ScalingList) sorting each factor of such transmission quantization matrix (ScalingFactor) by a predefined order into the entropy encoding unit 106.

The entropy encoding unit 106 performs the entropy encoding and outputting of, as encoding data e, information input from each unit, such as the output signal from the quantization unit 104, a motion vector information output from the motion vector calculation unit 114, or filter coefficient from the loop filter unit 110. Further, information input from each unit contains the TS flag input from the TS determination unit 103, scaling list and transmission quantization matrix enabling flag input from the quantization matrix determination unit 105. Moreover, the entropy encoding means a scheme to assign variable-length code depending on the frequency of appearance of the symbol.

The inverse quantization unit 107 performs the inverse quantization of quantized blocks input from the quantization unit 104 and generates the transformed blocks. The inverse quantization unit 107 inputs the transformed blocks it has generated into the inverse orthogonal transformation unit 108. The inverse quantization unit 107 uses quantization matrix determined by the quantization matrix determination unit 105 during the inverse quantization. In this way, the inverse quantization by the roughness of quantization during quantization is performed.

The inverse orthogonal transformation unit 108 performs the inverse orthogonal transformation process of the transformed blocks input from the inverse quantization unit 107 and then output them to the decoded image generation unit 109. The signal that is equivalent to the predicted difference signal before encoding can be obtained through the decoding process by these inverse quantization unit 107 and inverse orthogonal transformation unit 108.

The decoded image generation unit 109 adds the block data of predicted images selected by the predicted image selection unit 115 to the predicted difference signal that has undergone the decoding process by the inverse quantization unit 107 and the inverse orthogonal transformation unit 108. The decoded image generation unit 109 outputs the block data of decoded image generated after the addition of the loop filter unit 110.

The loop filter unit 110 may be, for example, any one SAO (Sample Adaptive filter), ALF (Adaptive Loop Filter) or blocking filter, or have several of them.

For example, the loop filter unit 110 divides the input images into groups for each predefined size and generates an appropriate filter coefficient for each group. The loop filter unit 110 divides the decoded images having undergone the filter process into groups for each predefined size, and, using the generated filter coefficient, performs the filter process for each group. The loop filter unit 110 outputs the filter process results to the decoded image storage unit 111, and stores it as reference images. The predefined size is, for example, the orthogonal transformation size.

The decoded image storage unit 111 stores the block data of the input decoded image as data of new reference images and outputs them to the intra-prediction unit 112, the inter-prediction unit 113 and the motion vector calculation unit 114.

The intra-prediction unit 112 generates the block data of predicted images from the reference pixels already encoded blocks in that images. The intra-prediction unit 112 performs the prediction using multiple prediction directions and determines the optimal prediction direction.

The inter-prediction unit 113 performs the motion compensation for the data of reference images retrieved from the decoded image storage unit 111 with the motion vectors provided by the motion vector calculation unit 114. In this way, the block data as the reference images that have undergone the motion compensation are generated.

The motion vector calculation unit 114 finds the motion vector with the block data in images to be encoded and reference images retrieved from the decoded image storage unit 111. The motion vector is a value indicating the spatial displacement by the block, which is found using technologies such as the block matching technology that searches the positions most similar to the blocks to be processed in the reference images block by block.

The motion vector calculation unit 114 outputs the found motion vector to the inter-prediction unit 113 and outputs the motion vector information that contains the information indicating the motion vector or reference images to the entropy encoding unit 106.

The block data output from the intra-prediction unit 112 and the inter-prediction unit 113 are input to the predicted image selection unit 115.

The predicted image selection unit 115 selects as the predicted images the block data of either those retrieved from the intra-prediction unit 112 or those from the inter-prediction unit 113. The selected predicted images are output to the predicted difference signal generation unit 101 and the decoded image generation unit 109.

Figure 2:
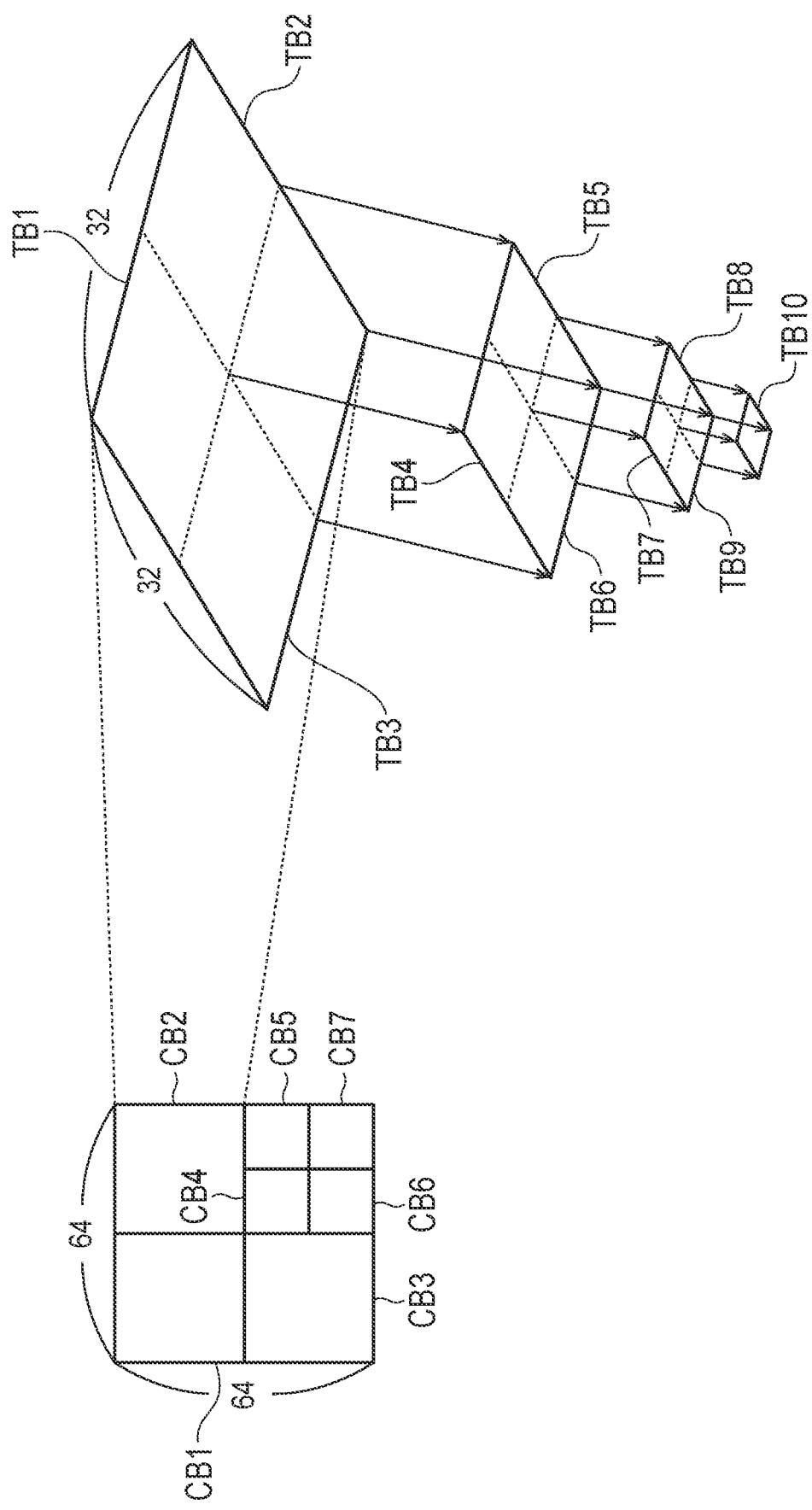
FIG. 2 is a pattern diagram to illustrate a encoding block and a transformation block in the same embodiment.

FIG. 2 is a pattern diagram to illustrate the encoding block and transformation block in this embodiment. By the pre-processing unit 100, each frame is divided into encoding blocks. The size of encoding block is any of 8×8, 16×16, or 32×32. In FIG. 2, the 64×64 block in the frame has been divided into 32×32 encoding blocks CB1, CB2, CB3 and 16×16 encoding blocks CB4, CB5, CB6, CB7.

Furthermore, the predicted difference signal corresponding to each encoding block is divided into transformation blocks by the orthogonal transformation unit 102. In FIG. 2, the 32×32 encoding block CB2 has been divided into 16×16 transformation blocks TB1, TB2, TB3, and 8×8 transformation blocks TB4, TB5, TB6, and 4×4 transformation blocks TB7, TB8, TB9, TB10.

FIG. 3, FIG. 4, FIG. 5 are tables to illustrate Quantization Matrices tb11, tb21, tb22 which have 16 quantization values in total, with 4 in the horizontal direction (4 columns), and 4 in the vertical direction (4 rows), respectively. The number of factors in Quantization Matrices tb11, tb21, tb22 is 4×4. Hence, they are used to quantize the 4×4 quantization blocks. The squares contained in each of Quantization Matrices tb11, tb21, tb22 indicate the factors. The numbers in each square indicate the quantization value.

The quantization matrix tb11 is one example of default quantization matrix based on the flat initial value, in which the quantization values of the factors are all 16. Here, flat means that all factors of the quantization matrix are of the same value. If such flat quantization matrix is used, quantization is performed with the same accuracy regardless of the factors of the quantization blocks. For this reason, when the orthogonal transformation is not performed, the deterioration of image quality due to the use of quantization matrix with a bias in the quantization value, such as quantization matrix tb21, can be avoided.

The quantization matrix tb21 is one example of transmission quantization matrix with inclination. Quantization matrix tb21 has larger quantization value as each of the degrees of the horizontal direction and vertical direction increases. The quantization values in the upper left corner (Row 1 Column 1), middle (Row 3 Column 2), and lower right corner (Row 4 Column 4) of quantization matrix tb21 are 6, 28, and 42 respectively. In such quantization matrix, the transformation coefficient of the factors arranged closer to the lower right, i.e., the transformation coefficient of higher band, is quantized with lower accuracy. For this reason, when orthogonal transformation is performed, it is allowed to reduce the amount of information in higher band through quantization without the deterioration of subjective image quality, utilizing the human visual characteristic that the lower the band, the more sensitive the vision is to the spatial variation of shade and hue.

The quantization matrix tb22 is another example of transmission quantization matrix with inclination. Quantization matrix tb22 also has larger quantization value as the degrees of horizontal direction and vertical direction each increase. For this reason, when the orthogonal transformation is performed, it is allowed to reduce the amount of information in the higher band through quantization without the deterioration of subjective image quality. However, the inclination of quantization values in quantization matrix tb22 is gentler than that of the quantization values in quantization matrix tb21.

Further, although in FIG. 3, FIG. 4, and FIG. 5, examples of 4×4 quantization matrix have been shown, the size of quantization block has four types: 4×4, 8×8, 16×16, and 32×32. Therefore, the size of quantization matrix also has four types: 4×4, 8×8, 16×16, and 32×32.

Figure 6:
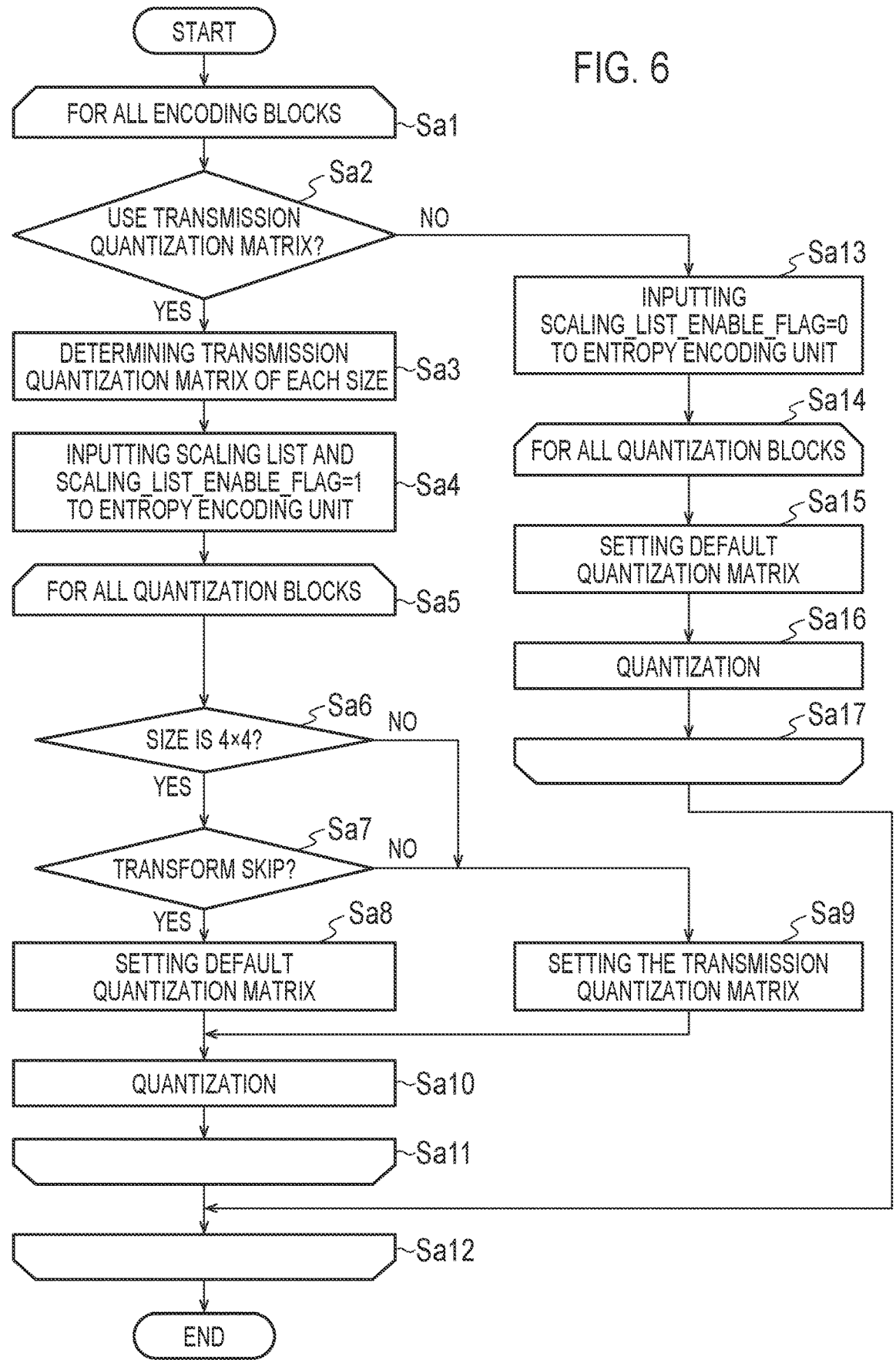
FIG. 6 is a flowchart to illustrate the processes of a quantization matrix determination unit 105 and a quantization unit 104 in the same embodiment.

FIG. 6 is a flowchart to illustrate the processing of the quantization matrix determination unit 105 and the quantization unit 104. The quantization matrix determination unit 105 and the quantization unit 104 select all encoding blocks one by one in order and perform the following processes of Step Sa2-Step Sa17 (Sa1). In Step Sa2, quantization matrix determination unit 105 determines whether or not to use the transmission quantization matrix to quantize the transformation blocks that belong to such encoding blocks (the selected encoding blocks). Any method may be used to determine whether or not to use the transmission quantization matrix. For example, one may judge, for the quantization blocks within that encoding block, whether or not the difference between the maximum and the minimum values of the factor exceeds a predefined range, and, if so, may decide to use the transmission quantization matrix.

When, in Step Sa2, it has been determined not to use transmission quantization matrix (Sa2—No), the quantization matrix determination unit 105 sets the transmission quantization matrix enabling flag relating to that encoding block to "0", and input it to the entropy encoding unit 106 (Sa13). If the value of transmission quantization matrix enabling flag is "0", it indicates that, when quantizing the quantization blocks in that encoding block, the transmission quantization matrix is not used, while the default quantization matrix is used.

Then, all quantization blocks in that encoding block are selected one by one in order, and the processes of Step Sa15, Sa16 are performed (Sa14). In Step Sa15, the quantization matrix determination unit 105 sets the default quantization matrix, which is by the size of quantization block, to the quantization unit 104 and inverse quantization unit 107. The default quantization matrix is a quantization matrix that uses the initial values stored and shared in advance with the decoding side as its factors. Further, in this embodiment, as with HEVC, the 4×4 default quantization matrix is flat, as quantization matrix tb11 in FIG. 3 and the default quantization matrices of the other sizes have the inclination.

That is to say, for the encoding blocks not using the transmission quantization matrix, when quantizing the 4×4 quantization block, flat default quantization matrix is always used regardless of whether TS has been performed.

Then, the quantization unit 104 quantizes each factor of such quantization block using the default quantization matrix set in Step Sa15 and generates the quantized blocks. The quantization unit 104 inputs the generated quantized blocks to the entropy encoding unit 106 and inverse quantization unit 107 (Sa16). For example, the quantization unit 104 selects, the transformation coefficient level value TransCoeffLevel[xTbY][yTbY][cIdx][x][y] during the quantization, where the inverse-quantized transformed blocks d[x][y] calculated by the inverse quantization unit 107 in Equation (1) is the most approximate to the quantization block input from the orthogonal transformation unit 102, and use it as the quantized block. Further, in Equation (1), m[x][y] is quantization matrix.

$$d[x][y]=\text{Clip3}(-32768,32767,((\text{TransCoeffLevel}[xTbY][yTbY][cIdx][x][y]*m[x][y]*\text{levelScale}[qP\%6])<<(qP/6))+(1<<(bdShift-1)))>>bdShift) \quad (1)$$

Here, Clip3 (a,b,xx) is a function that is set to a when real number xx is smaller than real number a, or b when real number xx is larger than real number b, or directly xx when real number xx is a or greater than a and is b or smaller than b. xTbY, yTbY indicates the coordinate values in the horizontal direction and the vertical direction in the upper left corner of the quantization block (object block) to be processed, respectively. "−32768" and "32767" indicates the minimum and maximum values of each factor shown in 16 bits, respectively. cIdx is an index showing the types of signal values. cIdx=0, 1, 2 indicate luminance signal, color difference signal Cb, and color difference signal Cr, respectively.

LevelScale[0] through levelScale[5] are 40, 45, 51, 57, 64, 72, respectively. qP is the quantization parameter, that is, an integral showing the quantization accuracy, which is a parameter to prompt to reduce the quantization value by half each time it increases by 6. qP %6 indicates the remainder obtained by dividing qP by 6. a<<b is a bit shift operator indicating that only the b digit of the value of a in binary representation is shifted to the left side, that is, multiplied by the b-th power of 2. a>>b is a bit shift operator indicating that only the b digit of the value of a in binary representation is shifted to the right side, that is, divided by the b-th power of 2.

BdShift is a bit shift value defined in advance according to the type of signal value. For example, if signal value is luminance signal Y, bdShift is $BitDepth_Y+Log\ 2(nTbS)-5$. $BitDepth_Y$ indicates the bit depth of luminance signal Y, i.e., number of quantization bits (for example, 16 bits). NTbS indicates the block size of the object block. If the signal value is color difference signal Cb or Cr, for bd, the quantization matrix determination unit 105 determines the Shift as $BitDepth_C+Log\ 2(nTbS)-5$. $BitDepth_C$ indicates the bit depth of luminance signals Cb, Cr, i.e., number of quantization bits (for example, 16 bits). Here, qP may be different values depending on the type of frame.

Then, the quantization matrix determination unit 105 judges whether or not the processes of Step Sa15, Sa16 have been performed to all quantization blocks belonging to that encoding block (Sa17), and, when such processes have been performed on all quantization blocks, proceeds to Step Sa12. When there exist any quantization blocks that have not undergone the processes of Step Sa15, Sa16, the quantization matrix determination unit 105 selects one quantization block not having undergone the process and return to Step Sa15.

On the other hand, in Step Sa2, when it has been judged that transmission quantization matrix shall be used in that encoding block (Sa2—Yes), the quantization matrix determination unit 105 determines the transmission quantization matrix (ScalingFactor) for each size (Sa3). For example, the quantization matrix determination unit 105 stores in advance multiple quantization matrices of all sizes, and select from them the one that can minimize the quantization error. Or, it may also calculate the quantization error and the evaluation value based on the quantized number of bits, and perform the selection according to this evaluation value.

Then, the quantization matrix determination unit 105 inputs the scaling list that aligns each factor of the determined transmission quantization matrix by a predefined order, and the transmission quantization matrix enabling flag (scaling_list_enable_flag) that has been set to "1" to the entropy encoding unit 106 (Sa4). Next, all quantization blocks in that encoding block are selected one by one in order, and processes from Step Sa6 through Sa10 are performed (Sa5).

In Step Sa6, the quantization matrix determination unit 105 judges whether the size of such quantization block is 4×4, that is, whether or not it is a quantization block to which TS can be performed. In Step Sa6, when the judgment is 4×4 (Sa6—Yes), the quantization matrix determination unit 105 judges whether or not such quantization block has undergone TS (Sa7). Further, in such judgment, TS flag input from the TS determination unit 103 is referred to.

When the judgment is TS in Step Sa7 (Sa7—Yes), the quantization matrix determination unit 105 sets 4×4 default quantization matrix to the quantization unit 104 and inverse quantization unit 107 (Sa8), and proceeds to Step Sa10. This 4×4 default quantization matrix is identical to that set in Step Sa15, which is a flat quantization matrix. On the other hand, when, in Step Sa6, the judgment is not 4×4 (Sa6—No), and, in Step Sa7, the judgment is not TS (Sa7—No), the quantization matrix determination unit 105 picks transmission quantization matrix the size of such quantization block from transmission quantization matrices determined in Step Sa3, and set it to the quantization unit 104 and the inverse quantization unit 107 (Sa9), and proceeds to Step Sa10.

That is, for encoding block using transmission quantization matrix, when quantizing a 4×4 quantization block, if it has already undergone TS, then the default quantization matrix is used, if not, then transmission quantization matrix is used. Accordingly, the flat quantization matrix may be used to those are already subjected to TS, and the quantization matrix with inclination may be used to those are not subjected to TS.

In Step Sa10, as with Step Sa16, the quantization unit 104 quantizes such quantization block using the quantization matrix set in Step Sa8 or Sa9, and generates quantized blocks. The quantization unit 104 inputs the generated quantized blocks to the entropy encoding unit 106 and the inverse quantization unit 107. Then, the quantization matrix determination unit 105 judges whether or not the processes from Step Sa6-Sa10 have been performed to all quantization blocks belonging to that encoding block (Sa11), and, when they have been performed on all quantization blocks, proceeds to Step Sa12. When there exist quantization blocks to which the processes of Step Sa6-Sa10 have not been performed, the quantization matrix determination unit 105 selects one of the quantization blocks not having undergone the processes, and return to Step Sa6.

In Step Sa12, the quantization matrix determination unit 105 judges whether or not the processes of Step Sa2-Sa17 have been performed for all encoding blocks. When there exist encoding blocks to which the processes of Step Sa2-Sa17 have not been performed, the quantization matrix determination unit 105 selects one of the encoding blocks not having undergone the processes and return to Step Sa2. The process is ended if all encoding blocks have undergone such processes.

Figure 7:
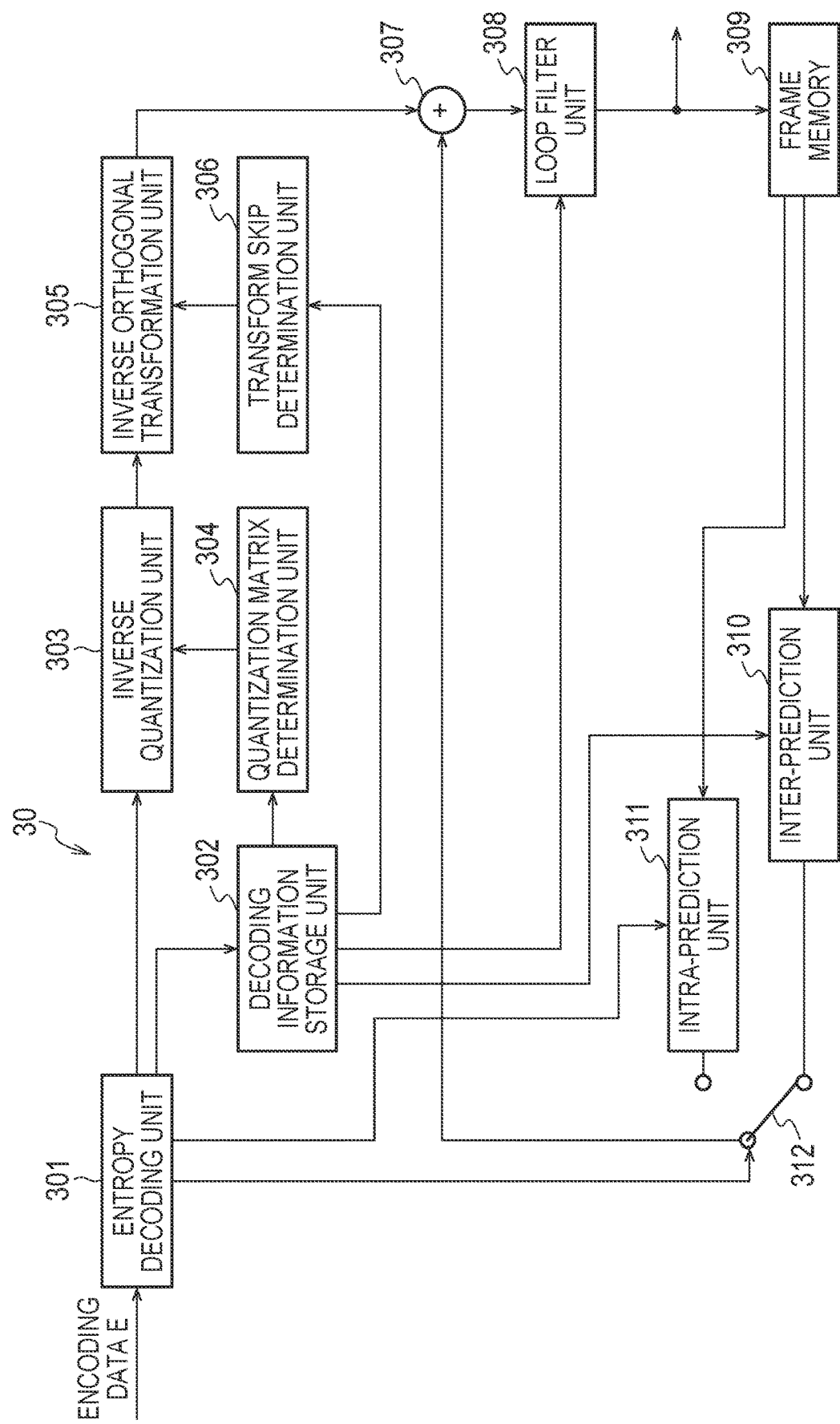
FIG. 7 is a schematic block diagram to illustrate the structure of an image decoding device 30 in the same embodiment.

Next, we will explain by an image decoding device 30, which generates the decoded images by decoding encoding data e generated by the image encoding device 10. FIG. 7 is a schematic block diagram to illustrate the structure of the image decoding device 30 in this embodiment. As shown in FIG. 7, the image decoding device 30 includes an the entropy decoding unit 301, a decoding information storage unit 302, an inverse quantization unit 303, a quantization matrix determination unit 304, an inverse orthogonal transformation unit 305, a TS determination unit 306, a decoded image generation unit 307, a loop filter unit 308, a frame memory 309, an inter-prediction unit 310, an intra-prediction unit 311, and a predicted image selection unit 312. The outlines of these units are each described below.

The entropy decoding unit 301 performs the entropy decoding corresponding to the entropy encoding by the entropy encoding unit 106 of the image encoding device 10, when encoding data e generated by image encoding device 10 is input. The prediction error signal decoded by the entropy decoding unit 301 (quantized blocks) is output to the inverse quantization unit 303. Moreover, the decoded TS flag, transmission quantization matrix enabling flag, scaling list, filter coefficient, and, in the case of inter-prediction, the decoded motion vector, etc., are input to the decoding information storage unit 302.

Moreover, the entropy decoding unit 301, in the case of intra-prediction, informs the intra-prediction unit 311 of that matter. Moreover, the entropy decoding unit 301 reports the predicted image selection unit 312 of information that the images to be decoded have been inter-predicted or intra-predicted.

The decoding information storage unit 302 stores decoding information such as the decoded TS flag, transmission quantization matrix enabling flag, scaling list, filter coefficient of the loop filter, the motion vector or the division mode.

The inverse quantization unit 303 performs the inverse quantization process represented by Equation (1) to the quantized blocks input from the entropy decoding unit 301, and generates the transformed blocks. These transformed blocks are the restored form of the quantization blocks generated by orthogonal transformation unit 102 in FIG. 1. The inverse quantization unit 303 inputs the transformed blocks to the inverse orthogonal transformation unit 305. Further, the inverse quantization unit 303 uses the quantization matrix set from the quantization matrix determination unit 304 when performing the inverse quantization process.

The quantization matrix determination unit 304 reads the TS flag, transmission quantization matrix enabling flag, and scaling list from the decoding information storage unit 302, generates the quantization matrix used in the inverse quantization of each quantized blocks and sets it to the inverse quantization unit 303.

The inverse orthogonal transformation unit 305 performs the inverse orthogonal transformation process to the transformed blocks input from the inverse quantization unit 303 and generates predicted difference restoration signal which has restored the predicted difference signal generated by the predicted difference signal generation unit 101 of the image encoding device 10. Further, for those transformed blocks for which it has been specified that inverse orthogonal transformation is disabled from the TS determination unit 306, the inverse orthogonal transformation unit 305 does not perform the inverse orthogonal transformation process, and directly uses them as predicted difference restoration signal. The inverse orthogonal transformation unit 305 inputs the predicted difference restoration signal to the decoded image generation unit 307.

The intra-prediction unit 311 generates the predicted image, using multiple prediction directions, from the already decoded surrounding pixels of the object image retrieved from the frame memory 309.

The inter-prediction unit 310 performs the motion compensation for the data of reference images retrieved from the frame memory 309 using the motion vector or division mode retrieved from decoding information storage unit 302. In this way, the block data of predicted images, which are composed of the reference images having undergone the motion compensation, are generated.

The predicted image selection unit 312 selects the predicted image from either the intra-predicted images or inter-predicted images following the notification from the entropy decoding unit 301. The block data of the selected predicted images are input to the decoded image generation unit 307.

The decoded image generation unit 307 adds the block data of predicted images input from the predicted image selection unit 312 to the predicted difference restoration signal input from the inverse orthogonal transformation unit 305 and generates the decoded images. The decoded images are input to the loop filter unit 308.

The loop filter unit 308 applies the filter for reducing block distortion to the decoded images output from the decoded image generation unit 307 and outputs the decoded images after the loop filter process to the frame memory 309. Further, the decoded images after the loop filter may also be output to display device, etc.

The frame memory 309 stores the decoded images, etc., that are the reference images. Further, although the decoding information storage unit 302 and the frame memory 309 are separate parts, they may also be the same storage unit.

Figure 8:
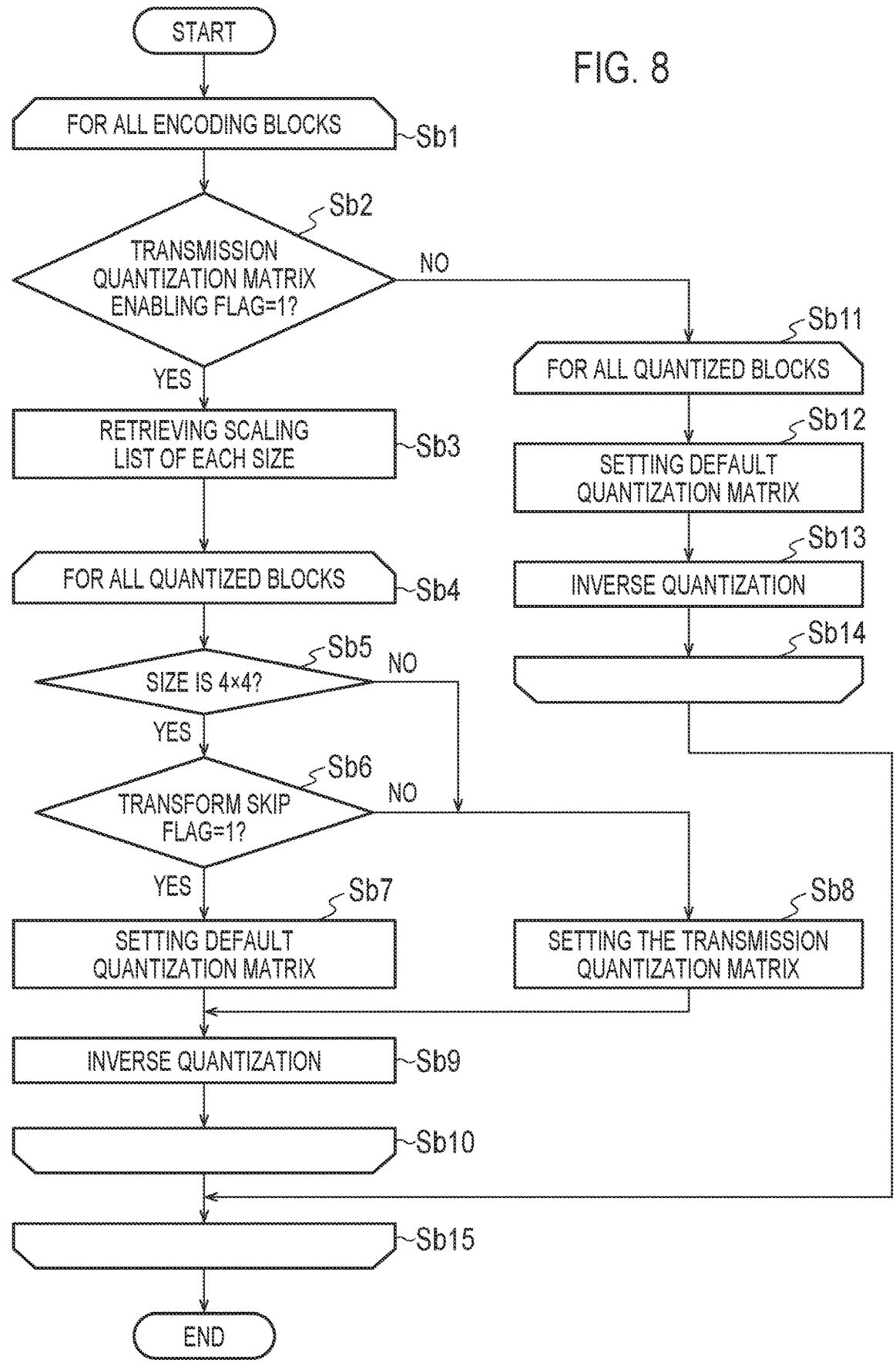
FIG. 8 is a flowchart to illustrate a quantization matrix determination unit 304 and an inverse quantization unit 303 in the same embodiment.

FIG. 8 is a flowchart to illustrate the operation of the quantization matrix determination unit 304 and the inverse quantization unit 303. The quantization matrix determination unit 304 and the inverse quantization unit 303 selects all encoding blocks one by one in order and performs the processes of the following Step Sb2 through Step Sb14 (Sb1). In Step Sb2, the quantization matrix determination unit 304 judges whether or not the transmission quantization matrix enabling flag of that encoding block is "1" concerning the decoding information storage unit 302.

When the judgment is that is not "1" (Sb2—No), the quantization matrix determination unit 304 and the inverse quantization unit 303 selects all quantized blocks in that encoding block one by one in order and perform the following processes of Step Sb12 through Step Sb13. In Step Sb12, the quantization matrix determination unit 304 judges whether or not the processes of Step Sb12-Sb13 have been performed to quantization blocks belonging to that encoding block (Sb14), and, when they have been performed on all quantization blocks, proceeds to Step Sb15. When there exist quantization blocks that is not subjected to the processes of Step Sb12-Sb13, quantization matrix determination unit 304 selects one of the quantization blocks not having undergone the processes and return to Step Sb12.

On the other hand, in Step Sb2, when it is judged that transmission quantization matrix enabling flag is "1" (Sb2—Yes), the quantization matrix determination unit 304 retrieves the scaling list of each size of that encoding block from decoding information storage unit 302 (Sb3). Next, the quantization matrix determination unit 304 and the inverse quantization unit 303 selects all quantized blocks one by one in order and perform the following processes of Step Sb5 through Step Sb10 (Sb4). First, quantization matrix determination unit 304 determines whether or not the size of such selected quantized block is 4×4 (Sb5). If it is judged to be 4×4 (Sb45—Yes), it further retrieves the TS flag of that quantized block from the decoding information storage unit 302, and determine whether or not the TS flag is "1" (Sb6).

When it is judged that TS flag is "1" (Sb6—Yes), the quantization matrix determination unit 304 sets the 4×4 default quantization matrix to the inverse quantization unit 303 (Sb7) and proceeds to Step Sb9. On the other hand, if it is judged to be not 4×4 in Step Sb5 (Sb5—No), and, the TS flag Step is judged to be not "1" in Sb6 (Sb6—No), the quantization matrix determination unit 304 picks the transmission quantization matrix generated from the scaling list of the size of that quantized block from the scaling lists retrieved from Step Sb3, and set it to the inverse quantization unit 303 (Sb8), and then proceeds to Step Sb9. Further, the quantization matrix determination unit 304 generates the transmission quantization matrix by using each value obtained by dividing the scaling list, as the factor of each predefined position.

In Step Sb9, as with Step Sb13, the inverse quantization unit 303 performs the inverse quantization on that quantized block with the quantization matrix set in Step Sb7 or Sb8 and generates transformed blocks. The inverse quantization unit 303 inputs the generated transformed blocks to the inverse orthogonal transformation unit 305. Then, the quantization matrix determination unit 304 determines whether or not the processes of Step Sb5-Sb9 have been performed to all quantized blocks belonging to that encoding block (Sb10), and, when they have been performed on all quantized blocks, proceeds to Step Sb15. When there exist any quantized blocks to which the processes of Step Sb5-Sb9 have not been performed, quantization matrix determination unit 304 selects one of the quantized blocks not having undergone the processes and return to Step Sb5.

In Step Sb15, the quantization matrix determination unit 304 determines whether the processes of Step Sb2-Sb14 have been performed to all encoding blocks (Sb15). When there exist any encoding blocks to which the processes of Step Sb2-Sb14 have not been performed, the quantization matrix determination unit 304 selects one of the encoding blocks not having undergone the processes and return to Step Sb2. When the processes have been performed for all encoding blocks, the process is ended.

In this way, the image encoding device 10 in this embodiment includes the TS determination unit 103, the orthogonal transformation unit 102, quantization matrix determination unit 105, and quantization unit 104. The TS determination unit 103 determines whether or not orthogonal transformation shall be enabled for each transformation block obtained by dividing the predicted difference signal that represents the difference between the input image and the predicted image. The orthogonal transformation unit 102 picks the transformation blocks that are judged to be applicable for orthogonal transformation from the transformation blocks and performs the orthogonal transformation to them, and generates the quantization blocks; it also picks the transformation blocks that are judged to be not applicable for orthogonal transformation from the transformation blocks, and directly use them as quantization blocks.

Moreover, the quantization matrix determination unit 105 determines for each quantization block the quantization matrix representing the roughness of quantization of each factor in quantizing each factor of the quantization block. The quantization unit 104 quantizes each factor of the quantization block with the quantization matrix determined by the quantization matrix determination unit 105. Then, the quantization matrix determination unit 105 makes the quantization matrix for the quantization block left as the original transformation block is by the orthogonal transformation unit 102 a quantization matrix with all of its factors' roughness of quantization being equal.

Thus, even if blocks having undergone the orthogonal transformation and blocks without orthogonal transformation coexist, because for the quantization blocks left as the original transformation blocks are, i.e., the quantization blocks to which orthogonal transformation have not been performed, all factors' roughness of quantization is equal, the variation between pixels resulting from quantization can be reduced, and the deterioration of subjective image quality can also be controlled.

Furthermore, the quantization matrix determination unit 105 uses the default quantization matrix to be shared in advance with the decoding side as the quantization matrix for the quantization block left as the original transformation block is by the orthogonal transformation unit 102.

Thus, used is the default quantization matrix with all factors' roughness of quantization being equal for the quantization of the quantization blocks left as the original transformation blocks are, i.e., the quantization blocks not subjected to the orthogonal transformation. Therefore, therefore, the variation between pixels resulting from quantization can be reduced, and the deterioration of subjective image quality can also be controlled.

Furthermore, the quantization matrix determination unit 105 determines either the default quantization matrix or the transmission quantization matrix to be transmitted to the decoding side shall be used as the quantization matrix, for each predefined unit (encoding block) composed of one or more said quantization blocks. Moreover, the quantization matrix determination unit 105 uses as the default quantization matrix the quantization matrix that is contained in the predefined unit determined to use the transmission quantization matrix and the quantization blocks left as the original transformation blocks by the orthogonal transformation unit 102.

Thus, used is the default quantization matrix with all factors' roughness of quantization being equal for the quantization of the quantization blocks not subjected to the orthogonal transformation, even if they are quantization blocks contained in the predefined unit (encoding block) for which the use of transmission quantization matrix is determined. Therefore, the variation between pixels resulting from quantization can be reduced, and the deterioration of subjective image quality can also be controlled.

In this way, the image decoding device 30 includes the quantization matrix determination unit 304, the inverse quantization unit 303, the TS determination unit 306, the inverse orthogonal transformation unit 305, and the decoded image generation unit 307. The quantization matrix determination unit 304 determines for each quantized block the quantization matrix representing the roughness of quantization of each factor in the inverse quantization of each factor of the quantized blocks contained in encoding data e. The inverse quantization unit 303 performs the inverse quantization to each factor of the quantized block with the quantization matrix determined by the quantization matrix determination unit 304, and generates the transformed blocks. The TS determination unit 306 determines whether or not the inverse orthogonal transformation shall be enabled for each transformed block.

Moreover, the inverse orthogonal transformation unit 305 picks those transformed blocks judged to be applied to the inverse orthogonal transformation from all transformed blocks and performs the inverse orthogonal transformation on them. The inverse orthogonal transformation unit 305 generates the predicted difference restoration signal; it also picks those transformed blocks judged to be not applicable for inverse orthogonal transformation from all transformed blocks and use them directly as the predicted difference restoration signal. The decoded image generation unit 307 (synthesizing unit) generates the decoded image from the predicted difference restoration signal and predicted image. The quantization matrix determination unit 304 uses a quantization matrix with all factors' roughness of quantization being equal as the quantization matrix used in generating the transformed blocks used directly as the predicted difference restoration signal by the inverse orthogonal transformation unit 305.

Thus, used is the quantization matrix with all factors' roughness of quantization being equal for the inverse quantization of quantized blocks corresponding to the transformed blocks directly used as predicted difference restoration signal without undergoing the inverse orthogonal transformation, even if the blocks subjected to the orthogonal transformation and blocks without orthogonal transformation coexist. Therefore, the variation between pixels resulting from quantization can be reduced, and the deterioration of subjective image quality can also be controlled.

Moreover, the quantization matrix determination unit 304 uses the default quantization matrix to be shared with the encoding side in advance as the quantization matrix used in generating the transformed blocks used directly as the predicted difference restoration signal by the inverse orthogonal transformation unit 305.

Thus, used is the default quantization matrix with all factors' roughness of quantization being equal for the inverse quantization of quantized blocks corresponding to the transformed blocks directly used as the predicted difference restoration signal without subjected to the inverse orthogonal transformation. Therefore, the variation between pixels resulting from quantization can be reduced, and the deterioration of subjective image quality can also be controlled.

Moreover, the quantization matrix determination unit 304 determines either the default quantization matrix or the transmission quantization matrix to be transmitted from the encoding side shall be used as the quantization matrix for each predefined unit (encoding block) composed of one or more quantized blocks. Moreover, the quantization matrix determination unit 304 uses, as the default quantization matrix, the quantization matrix used for generating the transformed blocks that is contained in the encoding block determined to use the transmission quantization matrix and that the inverse orthogonal transformation unit 305 directly uses the predicted difference block 305.

Thus, the default quantization matrix with all factors' roughness of quantization being equal is used for the inverse quantization of quantized blocks not subjected to the inverse orthogonal transformation after the inverse quantization, even if the quantized blocks is contained in the predefined unit (the encoding block) determined to use the transmission quantization matrix. Therefore, the variation between pixels resulting from quantization can be reduced, and the deterioration of subjective image quality can also be controlled.

Second Embodiment

In the following, with reference to the drawings, we will illustrate the second embodiment of this invention. In the first embodiment, an example of the use of default quantization matrix on those quantization blocks that undergo TS even if they belong to the encoding block using transmission quantization matrix. In the second embodiment, we will illustrate an example of the use of representative value quantization matrix, which is a flat quantization matrix generated from the transmission quantization matrix, on the quantization blocks that have undergone TS and belong to the encoding block using transmission quantization matrix.

The image encoding device 10 and the image decoding device 30 in this embodiment have the same structure as the image encoding device 10 in FIG. 1 and the image decoding device 30 in FIG. 7. However, the operation of the quantization matrix determination unit 105 in the image encoding device 10 and operation of the quantization matrix determination unit 304 in the image decoding device 30 are different. Therefore, we will explain on these operations.

Figure 9:
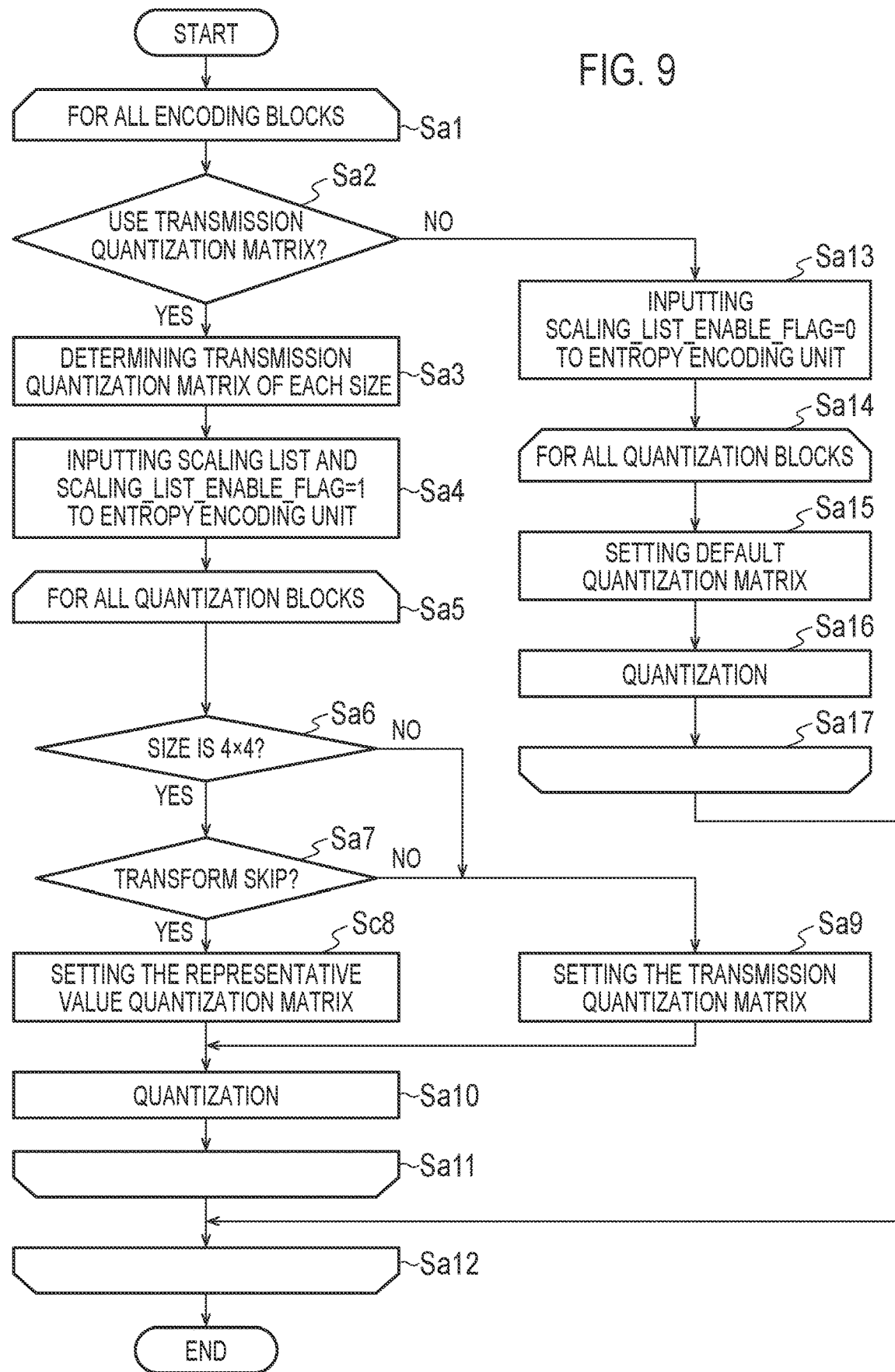
FIG. 9 is a flowchart to illustrate the operation of a quantization unit 104 and a quantization matrix determination unit 105 in the second embodiment of this invention.

FIG. 9 is a flowchart to illustrate the operation of the quantization unit 104, quantization matrix determination unit 105 in this embodiment. In FIG. 9, the same symbols (Sa1-Sa7, Sa9-Sa17) are added to the parts corresponding to those in FIG. 6, and the description is omitted. The flowchart of FIG. 9 is only different from the flowchart in FIG. 6 in that Step Sa8 is changed to Step Sc8. In Step Sc8, the quantization matrix determination unit 105 retrieves the representative value of one of the transmission quantization matrices determined in Step Sa3, of which the size is equal to that quantization block. The quantization matrix determination unit 105 sets the representative value quantization matrix of which all factors are of the same value as the representative value for the quantization unit 104 and inverse quantization unit 107.

For example, using the factor in the predefined position of the transmission quantization matrix as the representative value, a quantization matrix with all factors equal to this representative value is used as the representative value quantization matrix. This representative value quantization matrix $m[x][y]$ can, when the transmission quantization matrix is represented as $ScalingFactor[sizeId][x][y]$, be expressed in the form of Equation (2): $m[x][y]=ScalingFactor[sizeId][\alpha][\beta]$ ... (2) Here, $\alpha$, $\beta$ are integrals indicating the predefined positions in the horizontal direction and vertical direction, respectively, and their values range from either 0 through xTbS−1, or 0 through yTbS−1 (for example, 2). xTbS is the block size in the x direction; yTbs is the block size in the y direction. Both of them are "4". SizeId is an index indicating the size of quantization block. Here is has a value representing 4×4.

Further, as the representative value, instead of using specific factor, the average value, intermediate value, minimum value, maximum value or mode value of the factors of the transmission quantization matrix may also be used.

Figure 10:
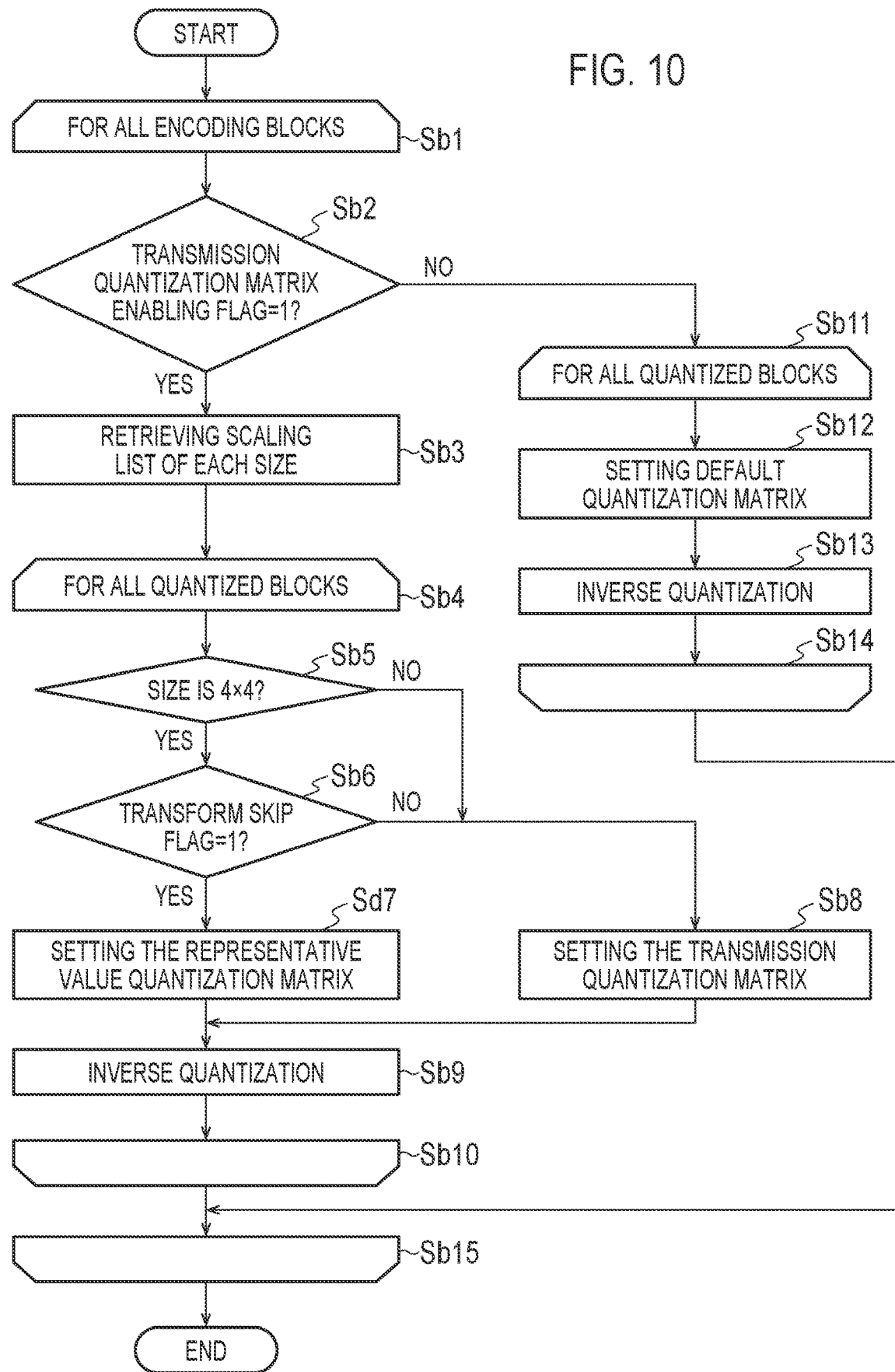
FIG. 10 is a flowchart to illustrate the operation of an inverse quantization unit 303 and a quantization matrix determination unit 304 in the same embodiment.

FIG. 10 is a flowchart to illustrate the operation of the inverse quantization unit 303 and the quantization matrix determination unit 304 in this embodiment. In FIG. 10, the same symbols (Sb1-Sb6, Sb8-Sa14) are added to the parts corresponding to those in FIG. 8, and the description is omitted. The flowchart in FIG. 10 is only different from the flowchart in FIG. 8 in that Step Sb7 is changed to Step Sd7.

In Step Sd7, the quantization matrix determination unit 304 generates the transmission quantization matrix from those of the scaling lists retrieved in Step Sb3 that is equal to the size of that quantized block, and retrieves one representative value of the generated transmission quantization matrix. The retrieving method of representative value is the same as in Step Sc7. The quantization matrix determination unit 304 sets the representative value quantization matrix of which all factors are of the same value as the representative value for the inverse quantization unit 303.

In this way, in the image encoding device 10 of this embodiment, the quantization matrix determination unit 105 uses the quantization matrix for the quantization blocks left as the original transformation blocks by the orthogonal transformation unit 102 as the representative value quantization matrix. All factors' roughness of quantization in the representative value quantization matrix is represented by the representative value of the factors constituting the predefined matrix.

Thus, used is the representative value quantization matrix with all factors' roughness of quantization being equal for the quantization of the quantization blocks left as the original transformation blocks, i.e., the quantization blocks not subjected to the orthogonal transformation. Therefore, the variation between pixels resulting from quantization can be reduced, and the deterioration of subjective image quality can also be controlled.

Furthermore, the quantization matrix determination unit 105 determines whether to use the default quantization matrix to be shared with the decoding side in advance or the transmission quantization matrix to be transmitted to the decoding side shall as the quantization matrix, for each predefined unit composed of one or more quantization blocks (encoding block). The quantization matrix determination unit 105 uses quantization matrix the quantization matrix for the quantization blocks is determined, and left as the original transformation blocks by the orthogonal transformation unit 102 as the representative value quantization matrix and contained in the predefined unit determined to use the transmission quantization matrix.

Thus, used is the representative value quantization matrix with all factors' roughness of quantization being equal for the quantization of the quantization blocks not subjected to the orthogonal transformation, even if they are quantization blocks contained in the predefined unit (encoding block) determined to use the transmission quantization matrix. Therefore, the variation between pixels resulting from quantization can be reduced, and the deterioration of subjective image quality can also be controlled.

As described above, in the image decoding device 30 of this embodiment, the quantization matrix determination unit 304 uses the quantization matrix for the quantization blocks left as the original transformation blocks by the inverse orthogonal transformation unit 305 as the representative value quantization matrix. All factors' roughness of quantization in the representative value quantization matrix is represented by the representative value of the factors constituting the predefined matrix.

Thus, used is the representative value quantization matrix with all factors' roughness of quantization being equal for the inverse quantization for generating the transformed blocks directly used as the predicted difference restoration signal. Therefore, the variation between pixels resulting from quantization can be reduced, and the deterioration of subjective image quality can also be controlled.

Furthermore, the quantization matrix determination unit 304 determines either the default quantization matrix to be shared in advance with the decoding side or the transmission quantization matrix to be transmitted from the encoding side shall be used as the quantization matrix for each predefined unit (encoding block) composed of one or more said quantized blocks. The quantization matrix determination unit 304 uses, as representative value quantization matrix, the quantization matrix that is contained in the predefined unit determined to use the transmission quantization matrix, and that is used for generating the transformed blocks used directly as the predicted difference restoration signal by the inverse orthogonal transformation unit 305. Moreover, the aforementioned predefined matrix is the transmission quantization matrix.

Thus, used is the representative value quantization matrix with all factors' roughness of quantization being equal for the inverse quantization of quantized blocks not subjected to the inverse orthogonal transformation after the inverse quantization, even if they are quantized blocks contained in the predefined unit (encoding block) determined to use the transmission quantization matrix. Therefore, the variation between pixels resulting from quantization can be reduced, and the deterioration of subjective image quality can also be controlled.

Third Embodiment

In the following, with reference to the drawings, we will illustrate the third embodiment of this invention. In the third embodiment, we will illustrate an example in which a value is transmitted from the encoding side to the decoding side, and a single flat value transmission quantization matrix is generated from that value and used to the quantization blocks that have undergone TS and belong to the encoding block using transmission quantization matrix.

The image encoding device 10 and the image decoding device 30 in this embodiment have the same structure as the image encoding device 10 in FIG. 1 and the image decoding device 30 in FIG. 7. However, the operation of the quantization matrix determination unit 105 in image encoding device 10 and operation of the quantization matrix determination unit 304 in the image decoding device 30 are different. Therefore, we will explain on these operations.

Figure 11:
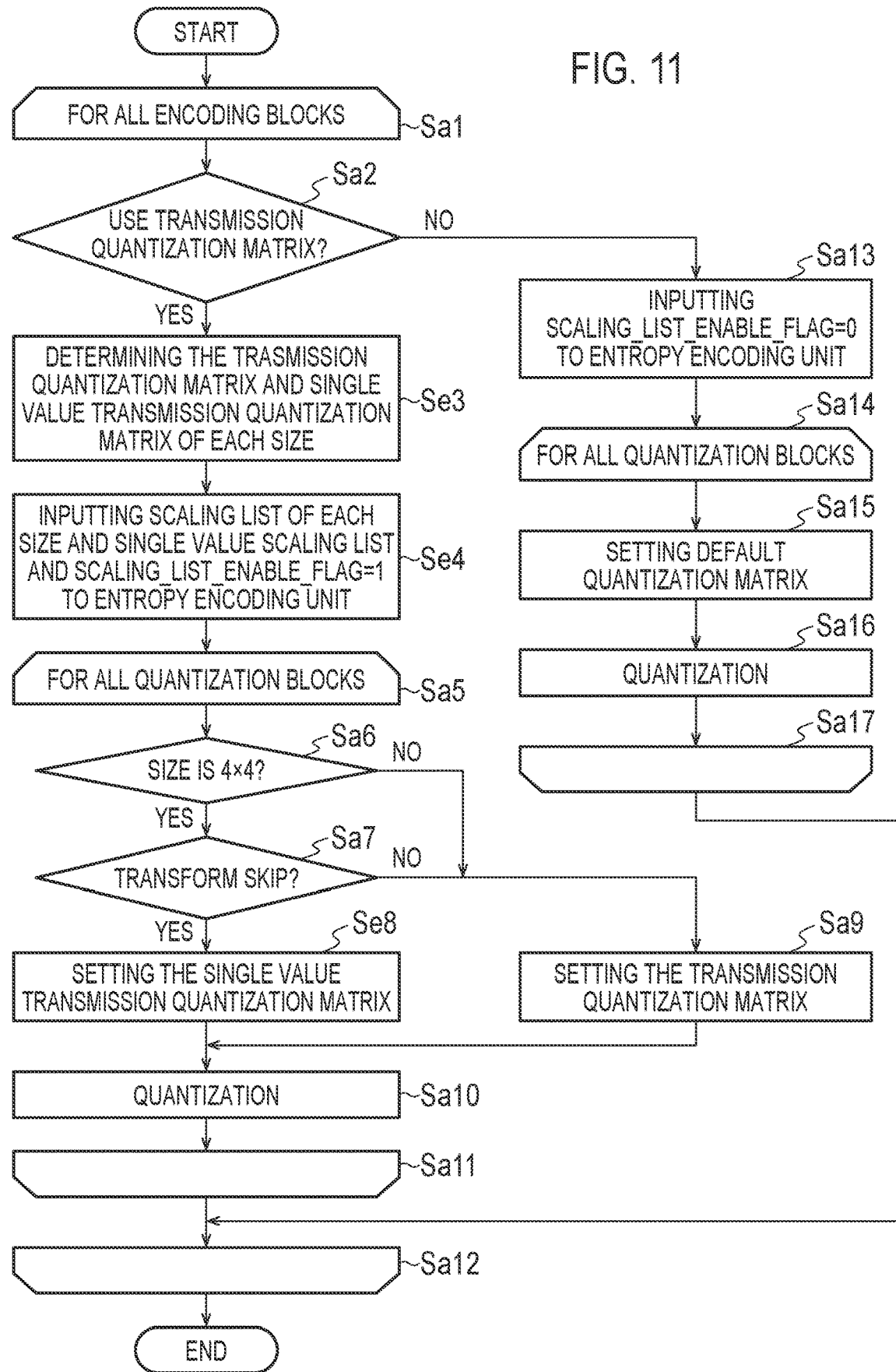
FIG. 11 is a flowchart to illustrate the operation of a quantization unit 104 and a quantization matrix determination unit 105 in the third embodiment of this invention.

FIG. 11 is a flowchart to illustrate the operation of the quantization unit 104, quantization matrix determination unit 105 in this embodiment. In FIG. 11, the same symbols (Sa1-Sa2, Sa5-Sa7, Sa9-Sa17) are added to the parts corresponding to those in FIG. 6, and the description is omitted. The flowchart of FIG. 11 is only different from the flowchart in FIG. 6 in that Steps Sa3, Sa4, Sa8 are each changed to Steps Se3, Se4, Se8.

In Step Se3, quantization matrix determination unit 105 determines the transmission quantization matrix (ScalingFactor) of each size, and the single value transmission quantization matrix (ScalingFactor_TS). Here, all factors of the single value transmission quantization matrix are of the same value. It is a quantization matrix that transmits one of these values to the decoding side. Further, this value may be a predefined value, or found from the distribution of factors of the quantization block having undergone TS.

In Step Se4, the quantization matrix determination unit 105 generates a scaling list sorting by a predefined order each factor of the transmission quantization matrix determined in Step Se3 and one value indicating the factors of the single value transmission quantization matrix. The quantization matrix determination unit 105 inputs it along with the transmission quantization matrix enabling flag (scaling_list_enable_flag) set to "1", to entropy encoding unit 106.

In Step Se8, the quantization matrix determination unit 105 sets the single value transmission quantization matrix determined in Step Se3 to the quantization unit 104 and inverse quantization unit 107. Further, the set single value transmission quantization matrix m[x][y] can, when the value indicating the factors of the single value transmission quantization matrix is represented as ScalingFactor_TS [sizeId], be expressed in the form of Equation (3): m[x][y]= ScalingFactor_TS[sizeId] . . . (3) SizeId is an index indicating the size of quantization block. Here is has a value representing 4×4.

Further, in this embodiment, the single value transmission quantization matrix is used only when the size is 4×4. Therefore, it does not necessarily have sizeId as an argument.

Moreover, in addition to the size of quantization block (SizeId), the value indicating the factors of the single value transmission quantization, matrixScalingFactor_TS, can also be determined for each combination of the other parameters. For example, other parameters include the type of signal value (luminance value Y, color difference Cb, Cr), the prediction mode of the encoding block to which the quantization block belongs (intra-prediction, inter-prediction, etc.) and so on.

Moreover, the determination of the single value transmission quantization matrix in Step Se3 and the input of scaling list of such single value transmission quantization matrix to the entropy encoding unit 106 may be carried out only when quantization block having undergone TS is contained in that encoding block.

Figure 12:
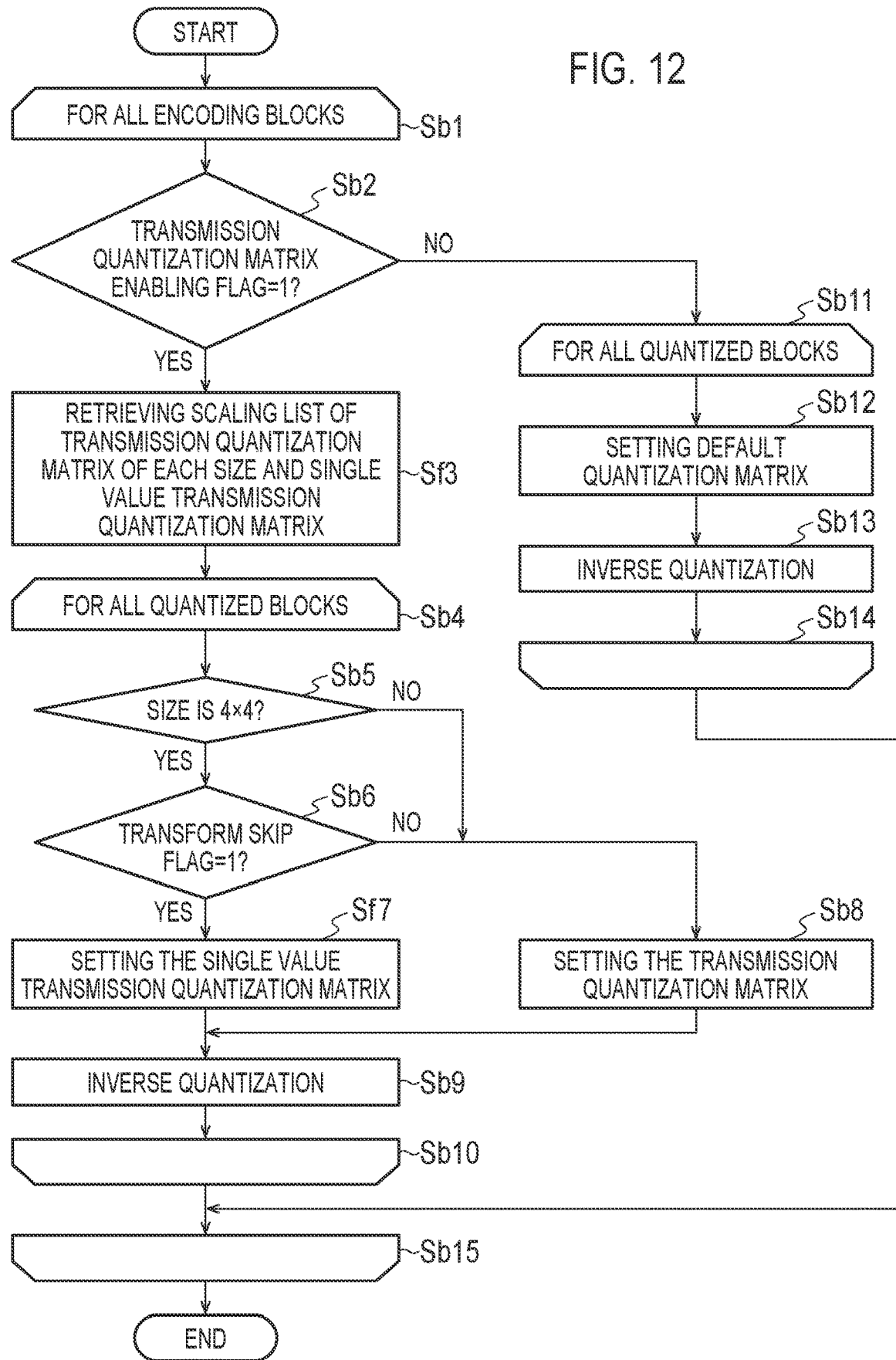
FIG. 12 is a flowchart to illustrate the operation of an inverse quantization unit 303 and a quantization matrix determination unit 304 in the same embodiment.

FIG. 12 is a flowchart to illustrate the operation of the inverse quantization unit 303 and the quantization matrix determination unit 304 in this embodiment. In FIG. 12, the same symbols (Sb1, Sb2, Sb4-Sb6, Sb8-Sa14) are added to the parts corresponding to those in FIG. 8, and the description is omitted. The flowchart of FIG. 12 is only different from the flowchart in FIG. 8 in that Steps Sb3, Sb7 are each changed to Steps Sf3, Sf7.

In Step Sf3, the quantization matrix determination unit 304 retrieves the scaling list of each size of that encoding block and the scaling list of the single value transmission quantization matrix from the decoding information storage unit 302.

In Step Sf7, the quantization matrix determination unit 304 generates the single value transmission quantization matrix from the scaling list of the single value transmission quantization matrix retrieved in Step Sf3, and sets it to the inverse quantization unit 303.

In this way, in the image encoding device 10 of this embodiment, the quantization matrix determination unit 105 uses the quantization matrix for the quantization blocks left as the original transformation blocks by the orthogonal transformation unit 102 as the single value transmission quantization matrix. All factors' roughness of quantization of the single value transmission quantization matrix is represented by a single value to be transmitted to the decoding side.

Thus, used is the single value transmission quantization matrix with all factors' roughness of quantization being equal for the quantization of the quantization blocks left as the original transformation blocks, i.e., the quantization blocks not subjected to the or, thogonal transformation. Therefore, the variation between pixels resulting from quantization can be reduced, and the deterioration of subjective image quality can also be controlled.

Moreover, the quantization matrix determination unit 105 determines either the default quantization matrix to be shared in advance with the decoding side or the transmission quantization matrix to be transmitted to the decoding side shall be used as the quantization matrix for each predefined unit composed of one or more quantization blocks (encoding block). The quantization matrix determination unit 105 uses as single value transmission quantization matrix the quantization matrix for the quantization blocks contained in the predefined unit for which the use of transmission quantization matrix is determined and also left as the original transformation blocks are by the orthogonal transformation unit 102.

Thus, used is the single value transmission quantization matrix with all factors' roughness of quantization being equal for the quantization of the quantization blocks not subjected to the orthogonal transformation, even if they are quantization blocks contained in the predefined unit (encoding block) determined to use the transmission quantization matrix is determined. Therefore, the variation between pixels resulting from quantization can be reduced, and the deterioration of subjective image quality can also be controlled.

Moreover, in this way, in the image decoding device 30 of this embodiment, the quantization matrix determination unit 304 uses the quantization matrix used for generating the transformed blocks that the inverse orthogonal transformation unit 305 directly uses the predicted difference restoration signal as the transformed blocks as the single value transmission quantization matrix. All factors' roughness of quantization contained in the single value transmission quantization matrix is represented by the single value to be transmitted from the encoding side.

Thus, used is the single value transmission quantization matrix with all factors' roughness of quantization being equal for the inverse quantization of quantized blocks corresponding to the transformed blocks directly used as the predicted difference restoration signal not subjected to the inverse orthogonal transformation. Therefore, the variation between pixels resulting from quantization can be reduced, and the deterioration of subjective image quality can also be controlled.

Furthermore, the quantization matrix determination unit 304 determines either the default quantization matrix to be shared in advance with the decoding side or the transmission quantization matrix to be transmitted from the encoding side shall be used as the quantization matrix for each predefined unit (encoding block) composed of one or more quantized blocks. The quantization matrix determination unit 304 uses the single value transmission quantization matrix as the quantization matrix contained in the predefined unit for which the use of transmission quantization matrix is determined and used in generating the transformed blocks used directly as the predicted difference restoration signal by the inverse orthogonal transformation unit 305.

Thus, used is the single value transmission quantization matrix with all factors' roughness of quantization being equal for the inverse quantization of the quantized blocks not subjected to the inverse orthogonal transformation after the inverse quantization, even if they are quantized blocks contained in the predefined unit (encoding block) determined to use the transmission quantization matrix. Therefore, the variation between pixels resulting from quantization can be reduced, and the deterioration of subjective image quality can also be controlled.

Fourth Embodiment

In the following, with reference to the drawings, we will illustrate the fourth embodiment of this invention. In the fourth embodiment, we will illustrate an example in which flat default quantization matrix is used for the quantization blocks that are applicable for TS and belong to the encoding block using transmission quantization matrix.

Figure 13:
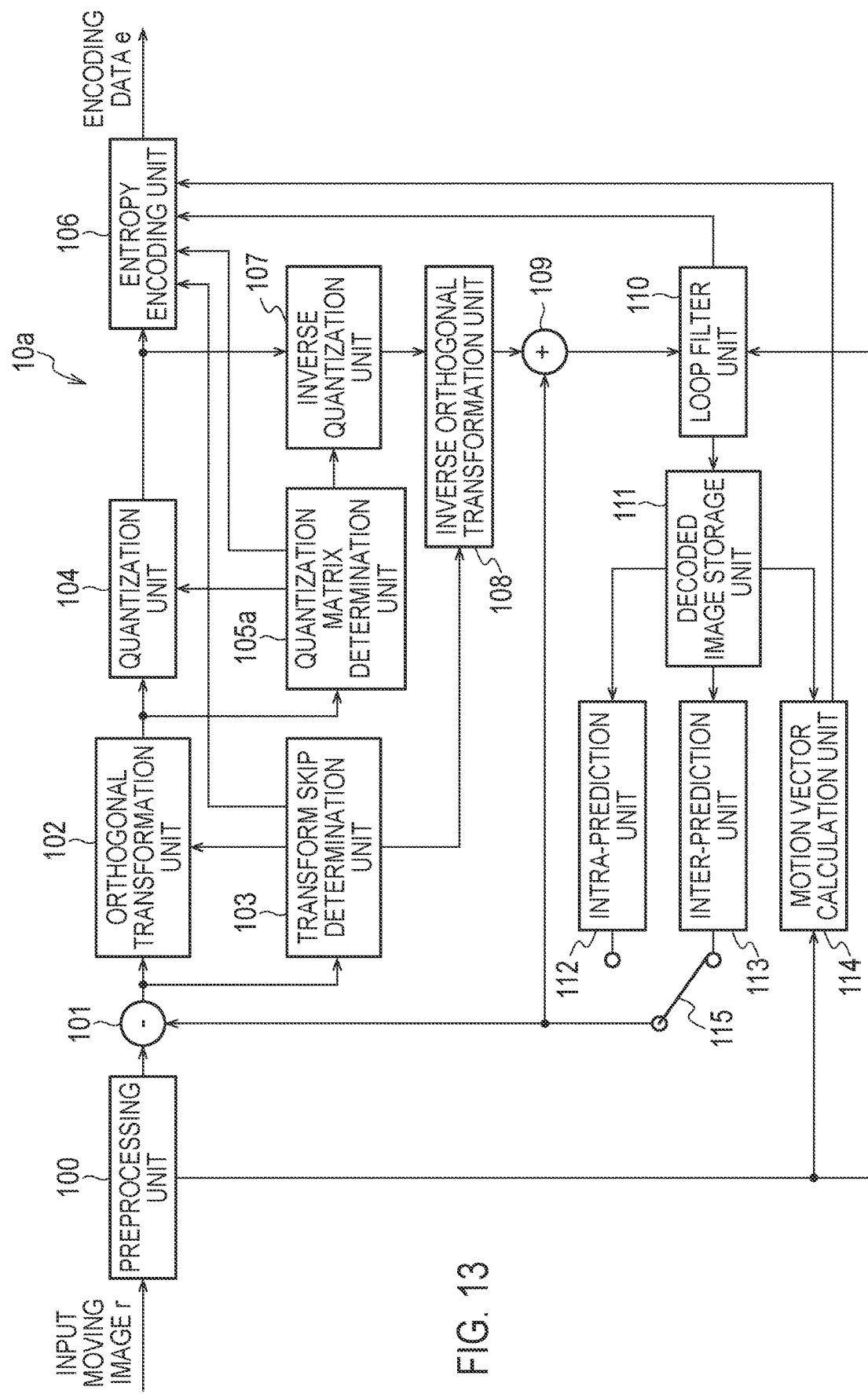
FIG. 13 is a schematic block diagram to illustrate the structure of an image encoding device 10a in the fourth embodiment of this invention.

FIG. 13 is a schematic block diagram to illustrate the structure of image encoding device 10a in this embodiment. In FIG. 13, the same symbols (100-104, 106-115) are added to the parts corresponding to those in FIG. 1, and the description is omitted. The image encoding device 10a is different from the image encoding device 10 in FIG. 1 only in that the quantization matrix determination unit 105 is changed to the quantization matrix determination unit 105a. The quantization matrix determination unit 105a is different from the quantization matrix determination unit 105 in that the determining result of the TS determination unit 103 is not referred when determining the quantization matrix.

Figure 14:
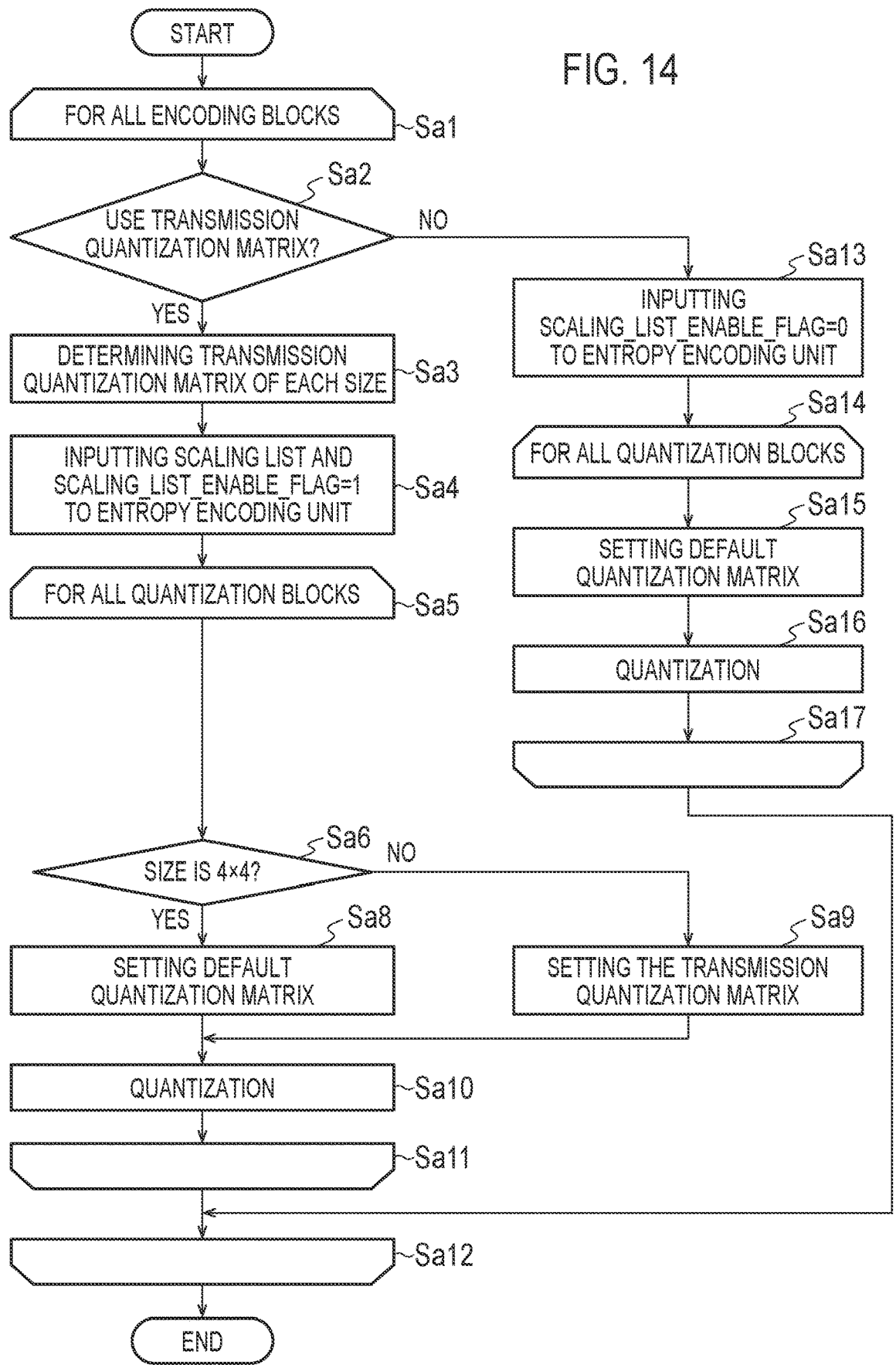
FIG. 14 is a flowchart to illustrate the operation of a quantization unit 104 and a quantization matrix determination unit 105a in the same embodiment.

FIG. 14 is a flowchart to illustrate the operation of the quantization unit 104, the quantization matrix determination unit 105a in this embodiment. In FIG. 14, the same symbols (Sa1-Sa17) are added to the parts corresponding to those in FIG. 6, and the description is omitted. The flowchart in FIG. 14 is only different from the flowchart in FIG. 6 in that it doesn't have Step Sa1, and, in Step Sa6, when it is judged that the size of quantization block is 4×4, it proceeds to Step Sa8.

Figure 15:
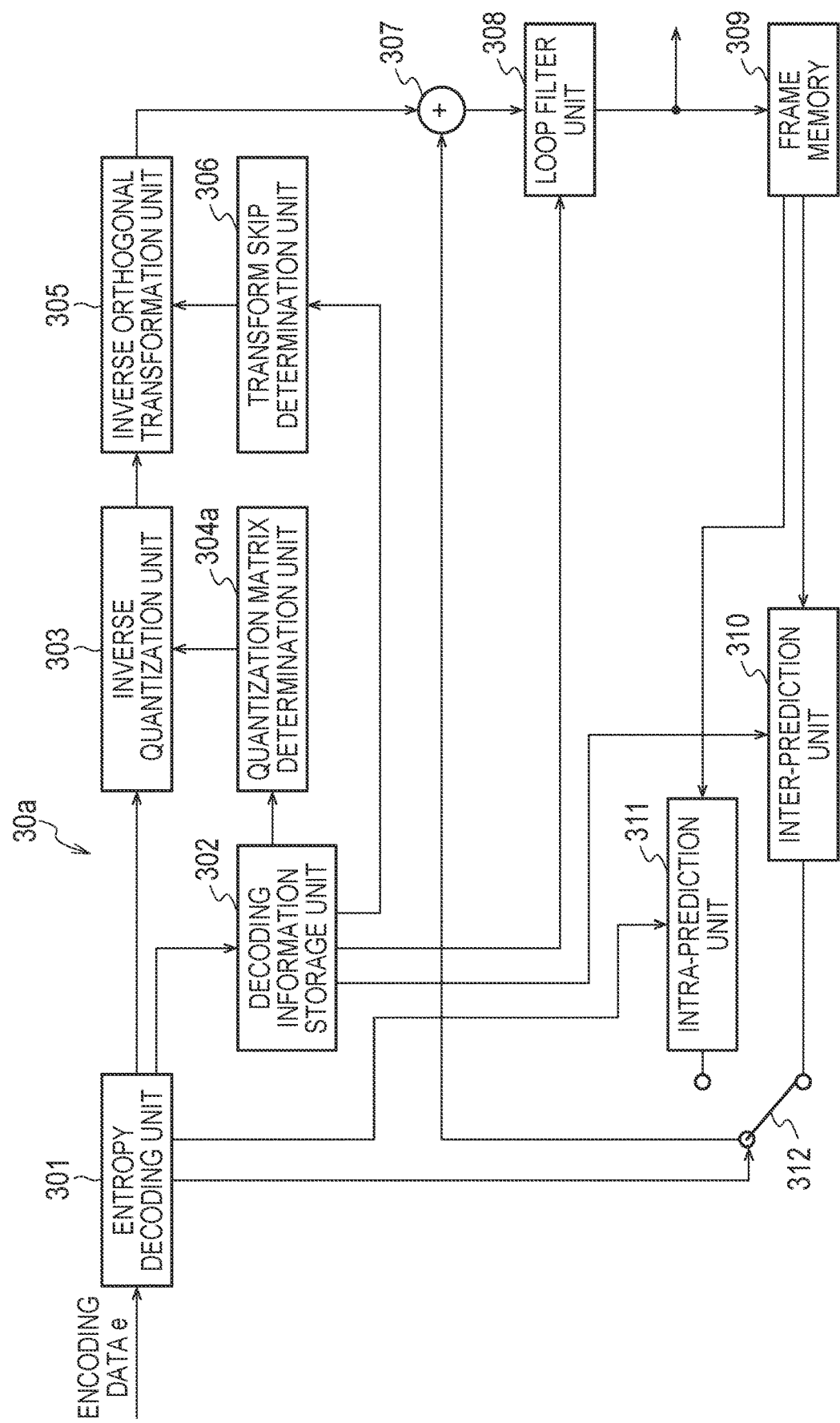
FIG. 15 is a schematic block diagram to illustrate the structure of an image decoding device 30a in the same embodiment.

FIG. 15 is a schematic block diagram to illustrate the structure of the image decoding device 30a in this embodiment. In FIG. 15, the same symbols (301-303, 305-312) are added to the parts corresponding to those in FIG. 7, and the description is omitted. The image decoding device 30a is only different from the image decoding device 30 in FIG. 7 in that the quantization matrix determination unit 304 is changed to the quantization matrix determination unit 304a. The quantization matrix determination unit 304a is different from quantization matrix determination unit 304 in that the TS flag is not read from the decoding information storage unit 302 when determining the quantization matrix.

Figure 16:
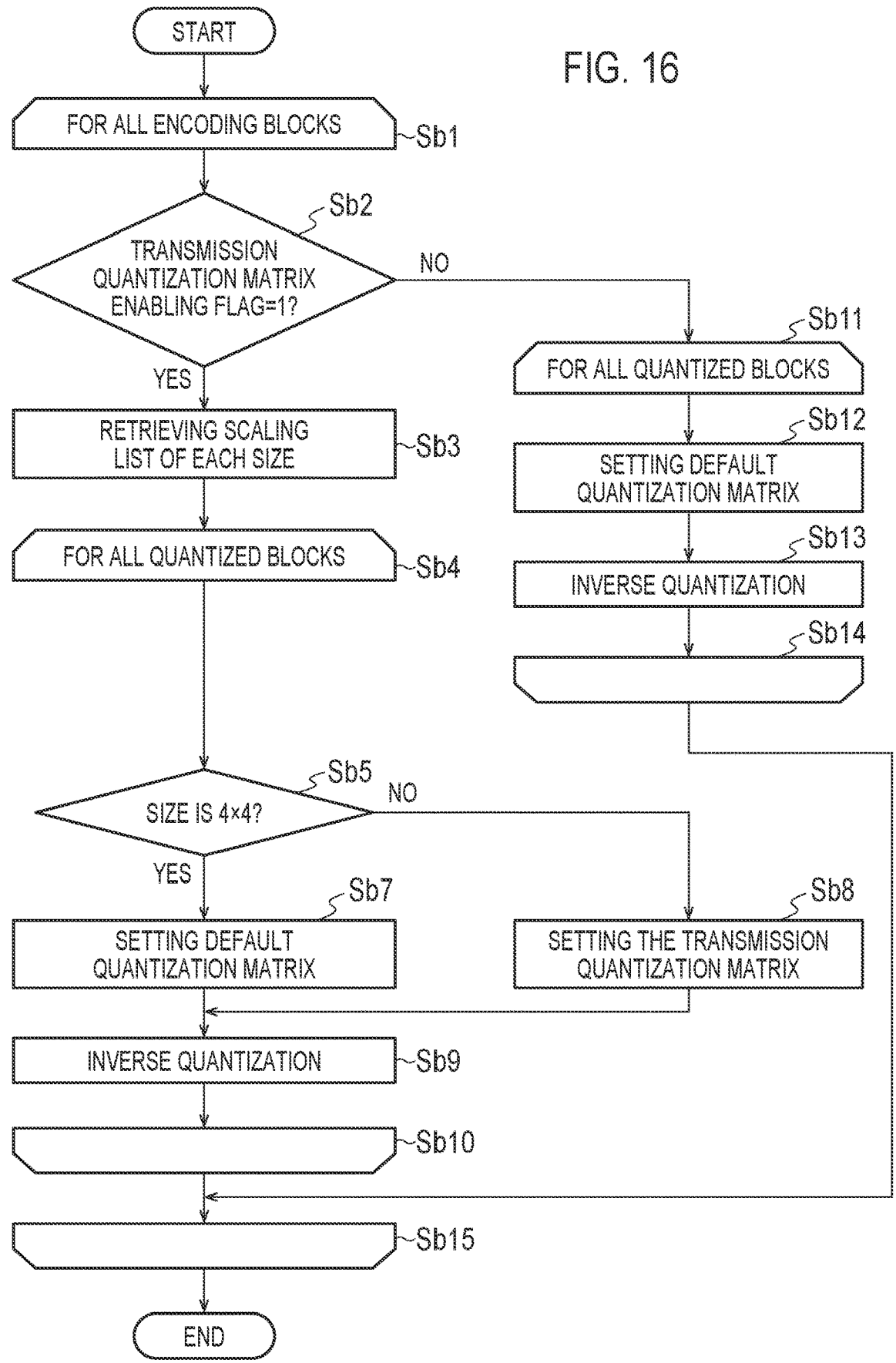
FIG. 16 is a flowchart to illustrate the operation of an inverse quantization unit 303 and a quantization matrix determination unit 304a in the same embodiment.

FIG. 16 is a flowchart to illustrate the operation of the inverse quantization unit 303 and the quantization matrix determination unit 304a in this embodiment. In FIG. 1, the same symbols (Sb1-Sb5, Sb7-Sb15) are added to the parts corresponding to those in FIG. 8, and the description is omitted. The flowchart in FIG. 16 is only different from the flowchart in FIG. 8 in that it doesn't have Step Sb6, and, in Step Sb5, when it is judged that the quantized blocks size is 4×4, it proceeds to Step Sb7.

In this way, in the image encoding device 10a of this embodiment, the quantization matrix determination unit 105a uses the matrix with all factors' roughness of quantization being equal as the quantization matrix for all quantization blocks of which the block size is the predefined block size (4×4).

Thus, the quantization matrix for the quantization block of the predefined block size not subjected to the orthogonal transformation is one with all factors' roughness of quantization being equal. Therefore, the variation between pixels resulting from quantization can be reduced, and the deterioration of subjective image quality can also be controlled.

Moreover, the quantization matrix determination unit 105a uses the default quantization matrix to be shared with the decoding side in advance as the quantization matrix for the quantization block of which the block size is the predefined block size (4×4). Moreover, of all default quantization matrices, those of the predefined block size are those whose all factors' roughness of quantization is equal.

Thus, used is the default quantization matrix with all factors' roughness of quantization being equal for the quantization of the quantization block of the predefined block size not subjected to the orthogonal transformation. Therefore, the variation between pixels resulting from quantization can be reduced, and the deterioration of subjective image quality can also be controlled.

Furthermore, the quantization matrix determination unit 105a determines either the default quantization matrix or the transmission quantization matrix to be transmitted to the decoding side shall be used as the quantization matrix for each predefined unit composed of one or more quantization blocks (encoding block). And, even if the quantization block is one that is contained in the predefined unit for which the use of transmission quantization matrix is determined, quantization matrix determination unit 105a uses the default quantization matrix as the quantization matrix for the quantization block of the predefined block size (4×4).

Thus, used is the default quantization matrix with all factors' roughness of quantization being equal for the quantization of quantization blocks of the predefined block size not subjected to the orthogonal transformation, even if they are quantization blocks contained in the predefined unit (encoding block) determined to use the transmission quantization matrix. Therefore, the variation between pixels resulting from quantization can be reduced, and the deterioration of subjective image quality can also be controlled.

In this way, in the image decoding device 30a of this embodiment, the quantization matrix determination unit 304a uses the quantization matrix with all factors' roughness of quantization being equal as the quantization matrix used for generating each of all transformed blocks of which the block size is the predefined block size (4×4).

Thus, in the quantization matrix of the quantized blocks of the predefined block size to which the orthogonal transformation is not performed, all its factors' roughness of quantization is equal. Therefore, the variation between pixels resulting from quantization can be reduced, and the deterioration of subjective image quality can also be controlled.

In this way, in image decoding device 30a of this embodiment, the quantization matrix determination unit 304a uses the default quantization matrix to be shared with the encoding side in advance, as the quantization matrix used in generating the transformed blocks of the predefined block size (4×4).

Thus, the quantization matrix for the quantized blocks of the predefined block size to which the orthogonal transformation is not performed after the inverse quantization is the default quantization matrix with all factors' roughness of quantization being equal. Therefore, the variation between pixels resulting from quantization can be reduced, and the deterioration of subjective image quality can also be controlled.

Furthermore, the quantization matrix determination unit 304a determines either the default quantization matrix or the transmission quantization matrix to be transmitted from the encoding side shall be used as the quantization matrix for each predefined unit (encoding block) composed of one or more said quantized blocks. The quantization matrix determination unit 304a uses the default quantization matrix as the quantization matrix contained in the predefined unit for which the use of transmission quantization matrix is determined and used in generating the transformed blocks of the predefined block size (4×4).

Thus, even if they are transformed blocks contained in the predefined unit (encoding block) for which the use of transmission quantization matrix is determined, the quantization matrix for the quantized blocks of the predefined block size to which the orthogonal transformation is not performed after the inverse quantization is the default quantization matrix with all factors' roughness of quantization being equal. Therefore, the variation between pixels resulting from quantization can be reduced, and the deterioration of subjective image quality can also be controlled.

Fifth Embodiment

In the following, with reference to the drawings, we will illustrate the fifth embodiment of this embodiment. In the fifth embodiment, we will illustrate an example in which flat transmission quantization matrix is used for the quantization blocks that are applicable for TS and belong to encoding block using transmission quantization matrix.

The image encoding device 10a and the image decoding device 30a in this embodiment have the same structure as the image encoding device 10a in FIG. 13, and the image decoding device 30a in FIG. 15. However, the operation of the quantization matrix determination unit 105 in the image encoding device 10a and the operation of the quantization matrix determination unit 304 in the image decoding device 30a are different. Therefore, we will explain on these operations.

Figure 17:
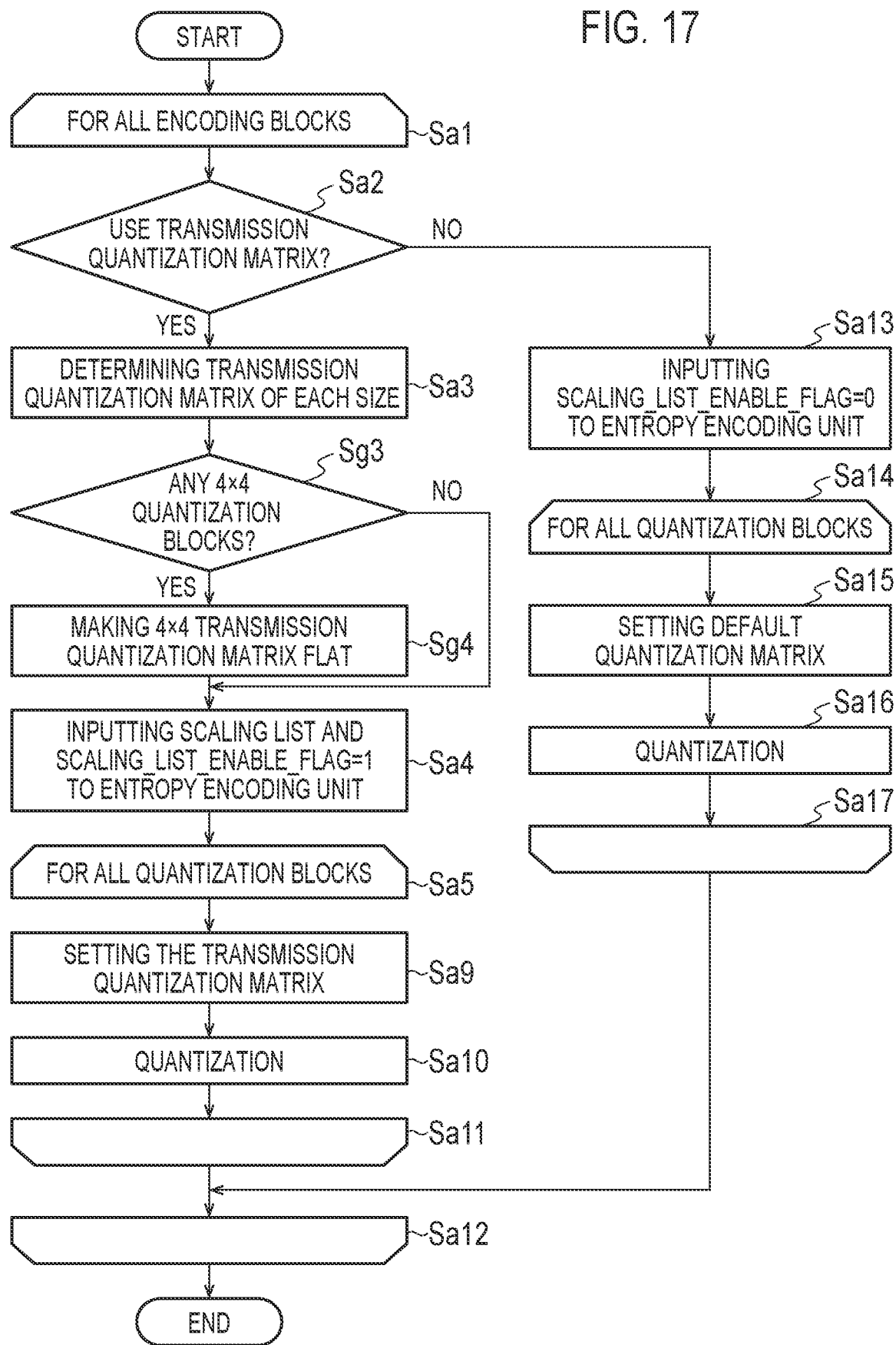
FIG. 17 is a flowchart to illustrate the operation of a quantization unit 104 and a quantization matrix determination unit 105a in the fifth embodiment of this invention.

FIG. 17 is a flowchart to illustrate the operation of the quantization unit 104, the quantization matrix determination unit 105a in this embodiment. In FIG. 17, the same symbols (Sa1-Sa5, Sa9-Sa17) are added to the parts corresponding to those in FIG. 6, and the description is omitted. The flowchart of FIG. 17 is only different from the flowchart of FIG. 6 in that it has Steps Sg3, Sg4 between Steps Sa3 and Sa4, and it doesn't have Step Sa6-Sa8, instead has Sa9 following Step Sa5.

In Step Sg3, quantization matrix determination unit 105a judges whether or not there are any 4×4 quantization blocks in that encoding block. When the judgment is no (Sg3—No), it directly proceeds to Step Sa4. On the other hand, when the judgment is yes in Step Sg3 (Sg3—Yes), quantization matrix determination unit 105a uses a flat matrix as the 4×4 transmission quantization matrix (Sg4) and proceeds to Step Sa4.

Figure 18:
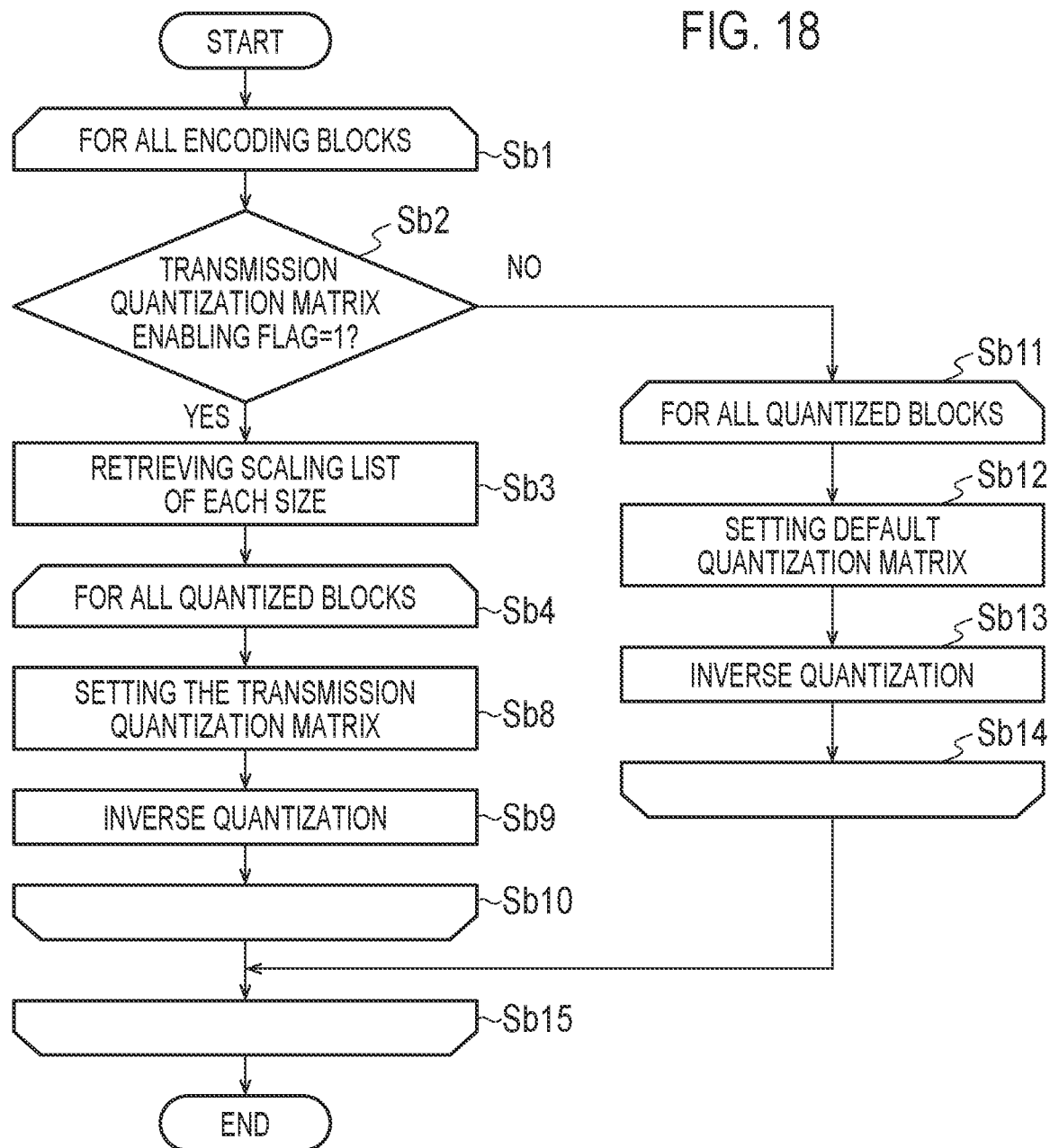
FIG. 18 is a flowchart to illustrate the operation of an inverse quantization unit 303 and a quantization matrix determination unit 304a in the same embodiment.

FIG. 18 is a flowchart to illustrate the operation of inverse quantization unit 303 and quantization matrix determination unit 304a in this embodiment. In FIG. 18, the same symbols (Sb1-Sb4, Sb8-Sb15) are added to those in FIG. 8, and the description is omitted. The flowchart of FIG. 18 is only different from the flowchart of FIG. 8 in that it doesn't have Steps Sb5-Sb7, and it has Sa8 following Step Sb4.

In this way, the quantization matrix determination unit 105a determines either the default quantization matrix to be shared in advance with the decoding side or the transmission quantization matrix to be transmitted to the decoding side shall be used as the quantization matrix for each predefined unit composed of one or more quantization blocks (encoding block). The quantization matrix determination unit 105a uses a matrix with all factors' roughness of quantization being equal as the quantization matrix for the quantization blocks of the predefined block size (4×4) contained in the predefined unit for which the use of transmission quantization matrix is determined.

Thus, used is the transmission quantization matrix with all factors' roughness of quantization being equal for the quantization of the quantization blocks of the predefined size that may not undergo the orthogonal transformation, even if they are quantization blocks contained in the predefined unit (encoding block) determined to use the transmission quantization matrix. Therefore, the variation between pixels resulting from quantization can be reduced, and the deterioration of subjective image quality can also be controlled.

Further, in each of the aforementioned embodiment, as an example of the case where the transformation blocks are applicable for TS, we have illustrated an example of the case where the size of such transformation block is 4×4. Nevertheless, other sizes may also be applied, or there may also be several applicable sizes. Or, methods in which criteria other than the size of transformation block are met can also be used, such as when the specific scheme is contained in the scheme to generate the predicted image in the domain corresponding to that transformation block.

Moreover, in each of the aforementioned embodiments, the size of encoding block has three types; 8×8, 16×16, and 32×32, and it has been stated that the size of transformation block and quantization block has four types: 4×4, 8×8, 16×16, 32×32. However, it shall not be limited to this. Other sizes can also be contained, or any size can be excluded. The number of types can either be large or small.

Moreover, in each of the aforementioned embodiments, it has been stated that the transmission quantization matrix is determined for each size of quantization block (SizeId). However, in addition to size, it can also determine for each combination of other parameters. For example, other parameters include the type of signal value (luminance value Y, color difference Cb, Cr), the prediction mode of the encoding block to which the quantization block belongs (intra-prediction, inter-prediction, etc.), and so on.

Moreover, in each of the aforementioned embodiments, the set of transmission quantization matrix (scaling list) is, as with the transmission quantization matrix enabling flag, determined for each encoding block. However, it may also be determined for each larger unit. For example, each frame or each unit that has multiple encoding blocks in it.

Moreover, the image encoding device 10 and the image decoding device 30 in each of the aforementioned embodiments may have a lossless mode to perform the lossless encoding of the input moving image.

Moreover, such device may also be realized by following. A computer-readable recording medium recorded with the programs to realize the function of the image encoding device 10 in FIG. 1, the image decoding device 30 in FIG. 7, the image encoding device 10a in FIG. 13 or the image decoding device 30a in FIG. 15. A computer system reads and implements such programs recorded on the recording medium. Further, the computer system referred to herein shall include hardware such as OS or peripheral equipment.

Moreover, the "computer-readable recording medium" refers portable medium such as a flexible disk, a magneto-optical disk, an ROM, a CD-ROM, and a storage device such as hard disk built in a computer system. Further, the "computer-readable recording medium" shall include those dynamically hold the programs for a short period such as the communication line when transmitting a program via a network such as the Internet or a communication line such as the telephone line, and those hold the programs for a particular period of time such as the volatile memory in a computer system acting as a server or a client in that case. Moreover, the program may be one for realizing a part of the aforementioned function or one that can realize the aforementioned function through the combination with a program already recorded in the computer system.

Moreover, each function block of the aforementioned image encoding device 10 in FIG. 1, image decoding device 30 in FIG. 7, image encoding device 10a in FIG. 13, or image decoding device 30a in FIG. 15 can be made into individual chips, or, a part of or all of them can be integrated on one chip. Moreover, the method of circuit integration is not limited to LSI. It may also be realized by a dedicated circuit or a general-purpose processor. Either of hybrid or monolithic is okay. A part of the functions may be realized by hardware while the other part of the software.

Moreover, if, with the advance in semiconductor technology, technologies of circuit integration, etc., which replaces LSI has appeared, it is also possible to use the integrated circuit according to such technology.

Now that we have described in detail the embodiments of this invention with reference to drawings. The specific composition shall not be limited to these embodiments, and include design changes without departing from the gist of this invention.

Further, the entire content of Japanese Patent Application 2013-203529 (Sep. 30, 2013) is incorporated herein by reference.

INDUSTRIAL APPLICABILITY

With this invention, even if blocks subjected to the orthogonal transformation and blocks not subjected to the orthogonal transformation coexist, the deterioration of subjective image quality resulting from quantization can be reduced.

What is claimed is:

1. An image encoding device comprising:
a determination unit that determines whether or not to skip an orthogonal transformation for an encoding target block, and
a quantization unit that quantizes the encoding target block using a first quantization matrix composed of elements having same roughness when a first or a second condition is satisfied, the first condition being that a determination is made to skip the orthogonal transformation and the encoding target block has a predefined size, the second condition being that a matrix enabling flag indicates not to apply a second quantization matrix composed of elements transmitted to an image decoding device, wherein
the quantization unit quantizes the encoding target block subjected to the orthogonal transformation using the second quantization matrix when the encoding target block does not have the predefined size and the second condition is not satisfied.

2. An image decoding device comprising:
a determination unit that determines whether or not to skip an inverse orthogonal transformation for a decoding target block, and
an inverse quantization unit that inversely quantizes the decoding target block using a first quantization matrix composed of elements having same roughness when a first or a second condition is satisfied, the first condition being that a determination is made to skip the inverse orthogonal transformation and the decoding target block has a predefined size, the second condition being that a matrix enabling flag indicates not to apply a second quantization matrix composed of elements transmitted from an image encoding device, wherein
the inverse quantization unit inversely quantizes the decoding target block subjected to the inverse orthogonal transformation using the second quantization matrix when the decoding target block does not have the predefined size and the second condition is not satisfied.

3. An image encoding method comprising:
determining whether or not to skip an orthogonal transformation for an encoding target block,
quantizing the encoding target block using a first quantization matrix composed of elements having same roughness when a first or a second condition is satisfied, the first condition being that a determination is made to skip the orthogonal transformation and the encoding target block has a predefined size, the second condition being that a matrix enabling flag indicates not to apply a second quantization matrix composed of elements transmitted to an image decoding device, and
quantizing the encoding target block subjected to the orthogonal transformation using the second quantization matrix when the encoding target block does not have the predefined size and the second condition is not satisfied.

4. An image decoding method comprising:
determining whether or not to skip an inverse orthogonal transformation for a decoding target block,
inversely quantizing the decoding target block using a first quantization matrix composed of elements having same roughness when a first or a second condition is satisfied, the first condition being that a determination is made to skip the inverse orthogonal transformation and the decoding target block has a predefined size, the second condition being that a matrix enabling flag indicates not to apply a second quantization matrix composed of elements transmitted from an image encoding device, and
inversely quantizing the decoding target block subjected to the inverse orthogonal transformation using the second quantization matrix when the decoding target block does not have the predefined size and the second condition is not satisfied.

\* \* \* \* \*